(12) United States Patent
Sugihara et al.

(10) Patent No.: US 8,684,576 B2
(45) Date of Patent: Apr. 1, 2014

(54) SOLID ELECTROLYTIC CAPACITOR

(75) Inventors: Ryosuke Sugihara, Osaka (JP); Yuhei Tsurumoto, Osaka (JP); Kazuto Fujihara, Osaka (JP)

(73) Assignee: Tayca Corporation, Osaka-shi (JP)

( * ) Notice: Subject to any disclaimer, the term of this patent is extended or adjusted under 35 U.S.C. 154(b) by 26 days.

(21) Appl. No.: 13/387,019

(22) PCT Filed: Nov. 22, 2010

(86) PCT No.: PCT/JP2010/070759
§ 371 (c)(1),
(2), (4) Date: Jan. 25, 2012

(87) PCT Pub. No.: WO2011/074380
PCT Pub. Date: Jun. 23, 2011

(65) Prior Publication Data
US 2012/0127634 A1    May 24, 2012

(30) Foreign Application Priority Data
Dec. 18, 2009    (JP) .................................. 2009-287047

(51) Int. Cl.
*H01G 9/02* (2006.01)
*B01J 13/00* (2006.01)
*H01M 6/14* (2006.01)
*B05D 5/12* (2006.01)

(52) U.S. Cl.
USPC ............. 362/525; 361/526; 427/80; 252/62.2

(58) Field of Classification Search
USPC ..................... 361/525, 526; 427/80; 252/62.2
See application file for complete search history.

(56) References Cited

U.S. PATENT DOCUMENTS

| | | |
|---|---|---|
| 2005/0013094 A1 | 1/2005 | Reuter et al. |
| 2005/0111165 A1 | 5/2005 | Merker et al. |
| 2007/0171597 A1 | 7/2007 | Merker et al. |
| 2008/0125571 A1 | 5/2008 | Oohata et al. |

FOREIGN PATENT DOCUMENTS

| | | | |
|---|---|---|---|
| EP | 803886 A2 * | 10/1997 | ............ H01G 9/025 |
| JP | 10-308117 A | 11/1998 | |

(Continued)

OTHER PUBLICATIONS

International Search Report of PCT/JP2010/070759, mailing date Mar. 1, 2011.

*Primary Examiner* — Eric Thomas
*Assistant Examiner* — Arun Ramaswamy
(74) *Attorney, Agent, or Firm* — Westerman, Hattori, Daniels & Adrian, LLP

(57) ABSTRACT

The present invention provides a solid electrolytic capacitor having a low ESR, excellent heat resistance, and reliability used under a high temperature condition. On the dielectric layer of the capacitor element, 2-alkyl-2,3-dihydro-thieno[3,4-b][1,4]dioxine monomer is subject to oxidation polymerization to provide a first conductive polymer layer. Then, 2,3-dihydro-thieno[3,4-b][1,4]dioxine or a monomer mixture of 2,3-dihydro-thieno[3,4-b][1,4]dioxine and 2-alkyl-2,3-dihydro-thieno[3,4-b][1,4]dioxine is subject to oxidation polymerization to provide a second conductive polymer layer. The formation of the first conductive polymer layer and the second conductive polymer layer is alternatively repeated. The first conductive polymer and the second conductive polymer serve as a solid electrolyte to provide a solid electrolytic.

10 Claims, 2 Drawing Sheets

(56) References Cited

FOREIGN PATENT DOCUMENTS

| | | |
|---|---|---|
| JP | 2000-068152 A | 3/2000 |
| JP | 2003-160647 A | 6/2003 |
| JP | 2004-035555 A | 2/2004 |
| JP | 2004-525946 A | 8/2004 |
| JP | 2004-265927 A | 9/2004 |
| JP | 2005-039276 A | 2/2005 |
| JP | 2005-123630 A | 5/2005 |
| JP | 2006-137940 A | 6/2006 |
| JP | 2007-027767 A | 2/2007 |
| JP | 2010-541260 A | 12/2010 |
| WO | 2009/047059 A1 | 4/2009 |

* cited by examiner

SOLID ELECTROLYTIC CAPACITOR

FIELD OF THE INVENTION

The present invention relates to a solid electrolytic capacitor using a conductive polymer as a solid electrolyte.

BACKGROUND OF THE INVENTION

A conductive polymer has such a high conductivity that it can be used as a solid electrolyte of a solid electrolytic capacitor such as tantalum solid electrolytic capacitor, aluminum solid electrolytic capacitor and niobium solid electrolytic capacitor.

As a conductive polymer in such an application, ones obtained from thiophene or its derivatives can be used, which are prepared through chemical oxidative polymerization or electrolytic oxidation polymerization.

As a dopant in performing the chemical oxidative polymerization of the thiophene or its derivatives, organic sulfonic acids can be mainly used. Among them, it is said that an aromatic sulfonic acid is preferred. As an oxidant, transition metals can be used, and among them, a ferric compound is said to be preferred. Usually, an aromatic sulfonic acid ferric salt can be used to serve as an oxidant and dopant agent to perform the chemical oxidative polymerization of thiophene or its derivatives.

Regarding thiophene or its derivatives, considering the balanced conductivity and heat resistance of the obtained conductive polymer as well as its utilization, 3,4-ethylenedioxythiophene has been often used. See Patent Publications Nos. 1 and 2 below.

However, the innovation of the solid electrolytic capacitor using a conductive polymer as a solid electrolyte is rapid. There is, therefore, demanded to further improve the properties.

Then, in order to improve the conductivity, there was a proposal to use 3,4-alkylenedioxy thiophene in which 3,4-ethylenedioxythiophene has a substitute of alkyl group. See Patent Publication No. 3 listed below. However, when using 3,4-alkylenedioxy thiophene, the heat resistance is significantly decreased, and therefore, when using it as a solid electrolyte of a solid electrolytic capacitor, the reliability of the solid electrolytic capacitor under a hot temperature condition can be reduced. Also, the value of ESR (equivalent series resistance) can become large. It, therefore, results in enhancing the power consumption as well as deteriorating the noise reduction characteristics.

PRIOR ART REFERENCES

Patent Publication

Patent Publication No. 1: Japanese Laid-open Patent Publication No. 2003-160647.
Patent Publication No. 2: Japanese Laid-open Patent Publication No. 2004-265927.
Patent Publication No. 3: Japanese Laid-open International Patent Publication No. 2004-525946.

SUMMARY OF THE INVENTION

Objectives to Solve by the Invention

The present invention has been accomplished in view of the above. The present invention provides a solid electrolytic capacitor having a low ESR and high reliability under a high temperature condition.

Means to Solve the Objectives

According to the present invention, the dielectric layer of the capacitor element is provided with a solid electrolyte as follows: A first conductive polymer layer is formed by oxidation polymerization of 2-alkyl-2,3-dihydro-thieno[3,4-b][1,4]dioxine as a monomer. Thereon, a second conductive polymer layer is formed by oxidation polymerization of 2,3-dihydro-thieno[3,4-b][1,4]dioxine, or a mixture of 2,3-dihydro-thieno[3,4-b][1,4]dioxine with 2-alkyl-2,3-dihydro-thieno[3,4-b][1,4]dioxine. By forming the solid electrolyte from the first conductive polymer and the second conductive polymer, the value of ESR can be lowered and the heat resistance can be excellent. So, such a solid electrolytic capacitor has high reliability under a high temperature condition.

That is, there is provided a solid electrolytic capacitor that includes: a capacitor element including a porous material of a valve metal such as tantalum, aluminum and niobium, and a dielectric layer of an oxidation film of the valve metal. The solid electrolytic capacitor also includes a solid electrolyte of a conductive polymer provided on the dielectric layer. The solid electrolyte includes: a first conductive polymer layer obtained by oxidation polymerization of 2-alkyl-2,3-dihydro-thieno[3,4-b][1,4]dioxine; and a second conductive polymer layer obtained by oxidation polymerization of 2,3-dihydro-thieno[3,4-b][1,4]dioxine or a mixture of 2,3-dihydro-thieno[3,4-b][1,4]dioxine with 2-alkyl-2,3-dihydro-thieno[3,4-b][1,4]dioxine. At least one of the first conductive polymer layer and at least one of the second conductive polymer layer are alternatively laminated. The first conductive polymer layer is provided on the dielectric layer of the capacitor element.

There is also provided a solid electrolytic capacitor that includes: a capacitor element including a porous material of a valve metal such as tantalum, aluminum and niobium, and a dielectric layer of an oxidation film of the valve metal; and a solid electrolyte of a conductive polymer provided on the dielectric layer. The solid electrolyte includes a lamination including: a first conductive polymer layer obtained by oxidation polymerization of 2-alkyl-2,3-dihydro-thieno[3,4-b][1,4]dioxine, including an aromatic sulfonic acid as dopant; and a second conductive polymer layer obtained by oxidation polymerization of 2,3-dihydro-thieno[3,4-b][1,4]dioxine or a mixture of 2,3-dihydro-thieno[3,4-b][1,4]dioxine with 2-alkyl-2,3-dihydro-thieno[3,4-b][1,4]dioxine, including an aromatic sulfonic acid as dopant. At least one of the first conductive polymer layer and at least one of the second conductive polymer layer are alternatively laminated. A third conductive polymer layer including a polymeric sulfonic acid as dopant is further laminated on the lamination. The first conductive polymer layer is provided on the dielectric layer of the capacitor element.

Effects of the Invention

The solid electrolytic capacitor of the present invention has a low ESR, excellent heat resistance, and high reliability under a high temperature condition.

The reasons why the solid electrolytic capacitor of the present invention has such properties as described above are explained. In synthesizing a conductive polymer to be a solid electrolyte, 2-alkyl-2,3-dihydro-thieno[3,4-b][1,4]dioxine is used as a monomer to obtain the first conductive polymer that has a high conductivity. Also, the negative effects by using the first conductive polymer of the 2-alkyl-2,3-dihydro-thieno[3,4-b][1,4]dioxine monomer alone can be overcome by further using a second conductive polymer made from 2,3-dihydrothieno[3,4-b][1,4]dioxine or a monomer mixture of 2,3-dihydro-thieno[3,4-b][1,4]dioxine with 2-alkyl-2,3-dihydro-thieno[3,4-b][1,4]dioxine. These reasons can be further described later in the section of "Embodiments to Carry Out the Invention," along with the preparation methods of the solid electrolytic capacitor.

BRIEF DESCRIPTION OF THE INVENTION

EMBODIMENTS TO CARRY OUT THE INVENTION

Figure 1:
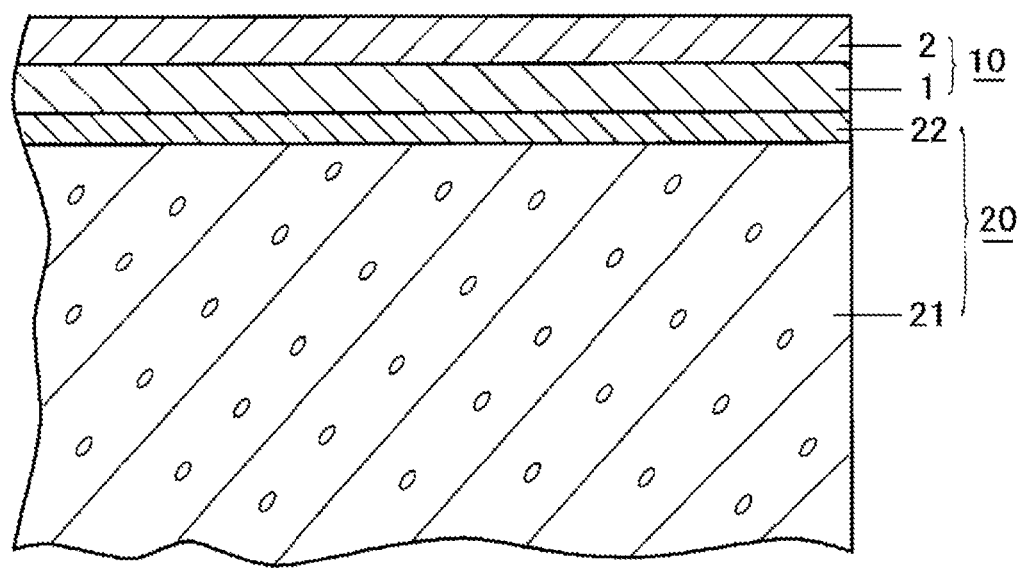
FIG. 1 is an illustration of a cross sectional view of an embodiment of the main part of the solid electrolytic capacitor of the present invention (i.e., the area around the solid electrolyte).

Formula 1 below is the monomers of the first conductive polymer and the second conductive polymer to form the solid electrolyte of the solid electrolytic capacitor of the present invention.

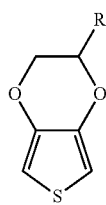

Formula 1

In formula 1, R represents hydrogen or alkyl group.

The compound of formula 1 in which R is hydrogen is referred to as, under the IUPAC Name, "2,3-dihydro-thieno[3,4-b][1,4]dioxine (2,3-Dihydro-thieno[3,4-b][1,4]dioxine)." This compound can be often referred to as its general name, "ethylenedioxythiophene," rather than the IUPAC Name. Thus, in this specification, 2,3-dihydro-thieno[3,4-b][1,4]dioxine is referred to as "ethylenedioxythiophene." Note that "ethylenedioxythiophene" is the same as "3,4-ethylenedioxythiophene" discussed before. When R is an alkyl group in formula 1, such an alkyl group can preferably be one with a carbon number of 1 to 4, that is, methyl group, ethyl group, propyl group, and butyl group. In detail, the compound of formula 1 in which R is methyl group is, under the IUPAC Name, "2-methyl-2,3-dihydro-thieno[3,4-b][1,4]dioxin (or 2-methyl-2,3-dihydro-thieno[3,4-b][1,4]dioxine)," which is hereinafter referred to as "methylated ethylenedioxythiophene." The compound in which R is ethyl group in formula 1 is, under the IUPAC Name, "2-ethyl-2,3-dihydro-thieno[3,4-b][1,4]dioxin (or 2-ethyl-2,3-dihydro-thieno[3,4-b][1,4]dioxine)," which is hereinafter referred to as "ethylated ethylenedioxythiophene" for simplification. The compound of formula 1 in which R is propyl group is, under the IUPAC Name, "2-propyl-2,3-dihydro-thieno[3,4-b][1,4]dioxin (or 2-propyl-2,3-dihydro-thieno[3,4-b][1,4]dioxine)" which is hereinafter referred to as "propylated ethylenedioxythiophene" for simplification. The compound of formula 1 in which R is butyl group is, under the IUPAC Name, "2-butyl-2,3-dihydro-thieno[3,4-b][1,4]dioxin (or 2-butyl-2,3-dihydro-thieno[3,4-b][1,4]dioxine)," which is hereinafter referred to as "butylated ethylenedioxythiophene" for simplification. Also, "2-alkyl-2,3-dihydro-thieno[3,4-b][1,4]dioxine" is referred to as "alkylated ethylenedioxythiophene" for simplification. As such an alkylated ethylenedioxythiophene, methylated ethylenedioxythiophene, ethylated ethylenedioxythiophene, propylated ethylenedioxythiophene, and butylated ethylenedioxythiophene can be preferable. In particular, ethylated ethylenedioxythiophene and propylated ethylenedioxythiophene can be preferred.

The monomer to produce the first conductive polymer is alkylated ethylenedioxythiophene as explained above, and the monomer to produce the second conductive polymer is ethylenedioxythiophene or a mixture of ethylenedioxythiophene with alkylated ethylenedioxythiophene.

Here, a preparation method is explained as to a solid electrolytic capacitor such as tantalum solid electrolytic capacitor, aluminum solid electrolytic capacitor and niobium solid electrolytic capacitor. There are two methods. (I): One the method is as follows: A conductive polymer to become a solid electrolyte is prepared in advance, which is made in a dispersion liquid of water, an aqueous liquid or an organic solvent. Then, the dispersion liquid of the conductive polymer is used in the preparation of a solid electrolytic capacitor. (II): Another method is as follows: A conductive polymer to be a solid electrolyte is synthesized during the preparation of a solid electrolytic capacitor. In the present invention, the first conductive polymer and the second conductive polymer, which can be used as a solid electrolyte, are synthesized during the preparation of a solid electrolytic capacitor (which is referred to as "polymerization on the spot"). The third conductive polymer can be one obtained by drying a dispersion liquid of a conductive polymer, which is prepared in advance.

First, the "polymerization on the spot" of the first conductive polymer during the preparation of a solid electrolytic capacitor is explained. A capacitor element of a porous material of a valve metal such as tantalum, aluminum and niobium, has formed a dielectric layer of an oxidation film of the valve metal. The capacitor element is immersed in a liquid including an alkylated ethylenedioxythiophene. Then, it is taken out. Then, it is immersed in a liquid including a dopant and an oxidant. Then, it is taken out to polymerize. Then, it is taken out for drying to obtain the first conductive polymer layer. Note that a single procedure above can make only a conductive polymer with very thin thickness. Thus, the procedure can be repeated up to four times, thereby forming a conductive polymer layer serving as the first conductive polymer layer. According to the research by the inventors of the present invention, up to four time repeats of the procedure for forming the first conductive polymer layer does not significantly increase the ESR value. However, more repeats than that can increase the ESR value.

That is, it was expected that a conductive polymer obtained by polymerizing alkylated ethylenedioxythiophene has a high conductivity, so that a solid electrolytic capacitor would have a low ESR value when using a solid electrolyte of such a conductive polymer obtained through the "polymerization on the spot" from a single monomer of alkylated ethylenedioxythiophene. Contrary to such expectation, the ESR value have became large. The reasons of such results are not sure at this point. However, it is considered that when a monomer of alkylated ethylenedioxythiophene is used to produce a conductive polymer as a solid electrolyte, and when the conductive polymer is repeatedly laminated, the contact resistance among the conductive polymers could become large, which would eventually increase the ESR value.

On the other hand, when ethylenedioxythiophene is made into a conductive polymer, its conductivity is lower than that from alkylated ethylenedioxythiophene. It was also found that when such a conductive polymer layer is laminated on a conductive polymer layer obtained from the alkylated ethylenedioxythiophene monomer, the ESR value can be reduced, though the ESR value becomes large when the conductive polymer from the alkylated ethylenedioxythiophene monomer is repeatedly laminated.

Therefore, in present invention, there was a disadvantage in the first conductive polymer from alkylated ethylenedioxythiophene; it has an excellent conductivity as a conductive polymer but shows large ESR when it is used in a solid electrolytic capacitor. However, such a disadvantage can be overcome by further laminating the second conductive polymer layer obtained from the ethylenedioxythiophene monomer. Therefore, the advantage of high conductivity of the conductive polymer obtained from the alkylated ethylenedioxythiophene monomer can be appropriately enjoyed.

That is, in the present invention, on the dielectric layer of a capacitor element, the first conductive polymer layer is made from alkylated ethylenedioxythiophene monomer, on which the second conductive polymer is made from ethylenedioxythiophene monomer. If necessary, the first conductive polymer layer and the second conductive polymer layer can be alternatively laminated to produce a solid electrolytic capacitor, which can be provided as a solid electrolytic capacitor with low ESR.

This explains with reference to FIG. 1. In FIG. 1, reference number 20 is a capacitor element. The capacitor element 20 is made of a porous material 21, that is a valve metal such as tantalum, aluminum and niobium. On the surface thereof, an oxidation film of the valve metal is formed to serve as a dielectric layer 22. On the dielectric layer 22 of the capacitor element 20, a first conductive polymer layer 1 is provided by means of oxidation polymerization of alkylated ethylenedioxythiophene (i.e., 2-alkyl-2,3-dihydro-thieno[3,4-b][1,4]dioxine) as a monomer. On the first conductive polymer layer, a second conductive polymer layer 2 is provided by means of oxidation polymerization of ethylenedioxythiophene (i.e., 2,3-dihydro-thieno[3,4-b][1,4]dioxine), or a mixture of ethylenedioxythiophene with alkylated ethylenedioxythiophene. The first conductive polymer and the second conductive polymer form the solid electrolyte 10.

In the solid electrolytic capacitor as shown in FIG. 1, single layer of the first conductive polymer layer 1 and single layer of the second conductive polymer layer 2 are laminated to form the solid electrolyte 10. If necessary, several layers can be alternatively laminated.

The first conductive polymer obtained from alkylated ethylenedioxythiophene monomer does not have good heat resistance. When the first conductive polymer is obtained from alkylated ethylenedioxythiophene monomer, and this alone forms a solid electrolyte to produce a capacitor, such a capacitor has deteriorated heat resistance. It results in deteriorating the reliability under a high temperature condition.

On the other hand, the second conductive polymer obtained from a monomer of ethylenedioxythiophene has an excellent heat resistance. When the second conductive polymer layer is laminated on the first conductive polymer obtained from alkylated ethylenedioxythiophene monomer, the heat resistance of the first conductive polymer can be improved.

The formation method of the second conductive polymer layer is explained. A capacitor element with a dielectric layer having formed the first conductive polymer layer is immersed into a liquid including ethylenedioxythiophene, and then it is taken out. Then, it is immersed into a liquid including a dopant and an oxidant, and then, it is taken out to perform polymerization. Then, it is immersed in water, and then, it is taken out and dried.

In the present invention, the term "alternative lamination" means a lamination in which the first conductive polymer obtained from alkylated ethylenedioxythiophene monomer and the second conductive polymer obtained from ethylenedioxythiophene monomer are alternatively laminated. The term "alternative lamination" does not include a single layer of the first conductive polymer or the second conductive polymer. As described before, the synthesis of the first conductive polymer through the "polymerization on the spot" from a monomer of alkylated ethylenedioxythiophene can be repeated up to four times. The synthesis of the second conductive polymer from a monomer of ethylenedioxythiophene through the "polymerization on the spot" can be repeated any times, but can be preferably repeated up to six times.

The reason why the first conductive polymer obtained from a monomer of alkylated ethylenedioxythiophene is provided on the dielectric layer of the capacitor element is because it is made from a monomer of alkylated ethylenedioxythiophene having a high conductivity, resulting in a solid electrolytic capacity having a low ESR.

Note that the term "on the dielectric layer" means a surface of the dielectric layer opposite to the surface (or side) contacting the porous material of the valve metal such as tantalum, aluminum and niobium. This means that the first conductive polymer is formed on the dielectric layer in any event, but does not necessarily mean that the first conductive polymer is formed above the dielectric layer in any direction.

As described above, on the dielectric layer of the capacitor element, the first conductive polymer obtained from a monomer of alkylated ethylenedioxythiophene is formed. Thereon, the second conductive polymer obtained from a monomer of ethylenedioxythiophene is formed. If necessary, these layers are alternatively laminated. Thereby, a solid electrolyte including the first conductive polymer and the second conductive polymer is formed. The solid electrolyte is covered with a carbon paste or silver paste to provide an exterior package to produce a tantalum solid electrolytic capacitor, aluminum solid electrolytic capacitor, niobium solid electrolytic capacitor or the like.

The explanation above is focused on a case where the raw material monomer for the second conductive polymer is ethylenedioxythiophene alone. Instead of using ethylenedioxythiophene alone, a mixture of ethylenedioxythiophene and alkylated ethylenedioxythiophene can be used to produce the second conductive polymer layer. In such a case, similar effects to the embodiment where ethylenedioxythiophene is solely used can be obtained.

Instead of using ethylenedioxythiophene alone, a mixture of ethylenedioxythiophene and alkylated ethylenedioxythiophene is at a mixture ratio as follows: Per one mole of ethylenedioxythiophene, alkylated ethylenedioxythiophene can be added at an amount of 0.5 moles or less, and in particular, 0.25 moles or less. In other words, when the ratio of alkylated ethylenedioxythiophene with respect to ethylenedioxythiophene exceeds 0.5 moles, the effects to reduce the ESR value cannot be fully obtained. In the explanation hereinafter, the production or construction of the second conductive polymer or the solid electrolyte is represented by the case where only ethylenedioxythiophene is used, unless explanation is focused on a mixture of ethylenedioxythiophene and alkylated ethylenedioxythiophene.

A dopant can make the polymer from alkylated ethylenedioxythiophene or ethylenedioxythiophene a conductive polymer. Such a dopant is not particularly limited. For example, aromatic sulfonic acids such as benzenesulfonic acid and its derivatives, naphthalenesulfonic acid and its derivatives, anthraquinonesulfonic acid and its derivatives; and polymeric sulfonic acid such as polystyrene sulfonic acid, sulfonated polyester, and phenol sulfonic acid novolak resin can be preferably used.

The benzenesulfonic acid derivatives can include toluenesulfonic acid, ethylbenzenesulfonic acid, propylbenzenesulfonic acid, butylbenzenesulfonic acid, dodecylbenzenesulfonic acid, methoxybenzenesulfonic acid, ethoxybenzenesulfonic acid, propoxybenzenesulfonic acid, butoxybenzenesulfonic acid, phenolsulfonic acid, cresolsulfonic acid, and benzenedisulfonic acid. The naphthalenesulfonic acid derivatives can include naphthalenedisulfonic acid, naphthalenetrisulfonic acid, methylnaphthalenesulfonic acid, ethylnaphthalenesulfonic acid, propylnaphthalenesulfonic acid, and butylnaphthalenesulfonic acid. The anthraquinonesulfonic acid derivatives can include anthraquinonedisulfonic acid, and anthraquinonetrisulfonic acid. The molecular weight of the aromatic sulfonic acids can be 450 or less. In particular, toluenesulfonic acid, methoxybenzenesulfonic acid, phenolsulfonic acid, naphthalenesulfonic acid, and naphthalenetrisulfonic acid can be preferable.

The polymeric sulfonic acid can include polystyrene sulfonic acid, sulfonated polyester, and phenol sulfonic acid novolak resin. The weight-average molecular weight of the polymeric sulfonic acid can be 5,000 or more. The polymeric sulfonic acid is hereinafter described in detail.

The polystyrene sulfonic acid can be one having a weight-average molecular weight of 5,000 to 1,000,000. Within the range specified above, it is preferable to be a weight-average molecular weight of 10,000 or more, more in particular, 20,000 or more, and yet more in particular, 40,000 or more. Also, it is preferable to be a weight-average molecular weight of 800,000 or less, and more in particular, 300,000 or less can be preferable.

The sulfonated polyester can be prepared by condensation polymerization of a mixture of dicarboxybenzenesulfonic acid or dicarboxybenzenesulfonic acid diester, such as sulfoisophthalic acid or sulfoisophthalic acid ester, and terephthalic acid or terephthalic acid ester, with an alkylene glycol. If necessary, terephthalic acid or terephthalic acid dimethyl can be further added. The polymerization can be conducted in the presence of catalyst such as antimony oxide and zinc oxide. The sulfonated polyester can be one having a weight-average molecular weight of 5,000 to 300,000, and in particular, of 10,000 or more, and more in particular, 20,000 or more; and yet, 100,000 or less, and more in particular, 80,000 or less.

The phenol sulfonic acid novolak resin can include a repeating unit as represented by the formula 2, which preferably has a weight-average molecular weight of 5,000 to 500,000. Within the range specified above, the weight-average molecular weight can be 10,000 or more, and in particular, 20,000 or more; and yet, 400,000 or less, and more in particular, 80,000 or less.

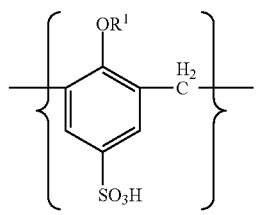

Formula 2

In formula 2, R1 is hydrogen or methyl group.

The polymeric sulfonic acid can also serve as an excellent dispersant during the polymerization of the conductive polymer such that polymerizable monomers and catalyst, if added, can be homogenously dispersed in water or an aqueous solution. It can be incorporated into the resultant polymer as a dopant, which contributes to high conductivity and excellent heat resistance of the conductive polymer.

The alkylated ethylenedioxythiophene used in polymerizing the first conductive polymer and the ethylenedioxythiophene used in polymerizing the second conductive polymer are liquid at room temperature, so that they can be used in the polymerization as it is. Nonetheless, in order to make the polymerization smooth, the monomer can be provided in an organic solvent solution by diluting with an organic solvent such as methanol, ethanol, propanol, butanol, acetone and acetonitrile. The first conductive polymer and the second conductive polymer can be prepared in the "polymerization on the spot" during the production of the solid electrolytic capacitor, so that the synthesis is performed through chemical oxidative polymerization. As an oxidant, persulfate and transition metal can be used. The persulfate can include ammonium persulfate, sodium persulfate, potassium persulfate, calcium persulfate, and barium persulfate. In particular, ammonium persulfate is preferable. As transition metal, iron, copper, cerium, chromium, manganese, ruthenium and zinc can be used. In particular, iron is preferable.

The temperature and the polymerization period in the chemical oxidative polymerization in the "polymerization on the spot" can be set to an appropriate temperature and polymerization period, which can be adopted from a wide range of temperature and polymerization time. Generally, a temperate between 0 to 300° C. and a polymerization period of 1 minute to 72 hours can be adopted.

In order to form the third conductive polymer layer, a dispersion liquid including a conductive polymer can be used, which can have been prepared in advance. In synthesizing the third conductive polymer, either of chemical oxidative polymerization or electrolytic oxidation polymerization can be adopted. The oxidation polymerization can be performed in water, or in an aqueous solution of water and a water-miscible solvent. As water-miscible solvent used in the aqueous solution, methanol, ethanol, propanol, acetone, and acetonitrile can be used. The mixture ratio of the water-miscible solvent in water can be 50 mass % or less.

In synthesizing the third conductive polymer, the temperature during the chemical oxidative polymerization can be 5 to 95° C. and the polymerization period can be 1 hour to 72 hours.

The electrolytic oxidation polymerization can be performed either under a constant current or constant voltage condition. For example, when the electrolytic oxidation polymerization is performed under a constant current condition, the current value can be between 0.05 mA/cm$^2$ and 10 mA/cm$^2$, and in particular, between 0.2 mA/cm$^2$ and 4 mA/cm$^2$. When the electrolytic oxidation polymerization is performed under a constant voltage condiction, the voltage can be between 0.5V and 10V, and in particular, between 1.5V and 5V. The temperature of the electrolytic oxidation polymerization can be between 5° C. and 95° C., and in particular, between 10° C. and 30° C. The polymerization period can be between 1 hour and 72 hours, and in particular, between 8 hours and 24 hours. A catalyst of ferrous sulfate or ferric sulfate can be added in the electrolytic Oxidation polymerization.

The conductive polymer (i.e., the third conductive polymer) can be obtained as a dispersion in water or an aqueous solution, including persulfate as oxidant and decomposed compounds generated from iron sulfate salt catalysts. Then, the aqueous dispersion liquid of the conductive polymer, including the impurities, can be subject to a dispersion machine such as ultrasonic homogenizer or planetary ball mill to separate the impurities, and then, to remove the metal components by cation-exchange resin. The particle size of the conductive polymer can be 100 μm or less, and in particular, 10 μm or less. Then, by performing ethanol precipitation method or ultrafiltration method, or by using anion-exchange resin, the decomposed compounds such as sulfuric acid from oxidant or catalyst can be removed as much as possible.

In the present invention, the reasons why to adopt the third conductive polymer are explained.

That is, the effects of the present invention can be obtained by the first conductive polymer layer on the dielectric layer of the capacitor element and the second conductive polymer layer, in which they are alternatively formed. The first conductive polymer layer and the second conductive polymer layer to become a solid electrolyte are produced by the "polymerization on the spot." Here, such a polymerization (i.e., "polymerization on the spot") must be repeated several times, but such repeats result in elongating the time for preparing the solid electrolytic capacitor.

On the other hand, when using a conductive polymer that has been prepared in advance, the production time can be efficiently reduced compared to the case only through the "polymerization on the spot." In the present invention, the effects from the lamination of the first conductive polymer layer and the second conductive polymer layer can be obtained, but by using the third conductive polymer layer from the dispersion liquid including the third conductive polymer, the production time of the solid electrolytic capacitor as well as the production cost can be significantly reduced. Also, when using the dispersion liquid of the conductive polymer and forming the conductive polymer layer, the voltage resistance of the resultant solid electrolytic capacitor can be increased. Note that the reason why the voltage resistance is increased is not found at this point.

Now, an embodiment of the solid electrolyte in which the third conductive polymer is used in the present invention is described with reference to FIG. 2.

First, in a similar manner as shown in FIG. 1, this embodiment forms the first conductive polymer layer 1 on the dielectric layer 22 of the capacitor element 20. On the first conductive polymer layer 1, the second conductive polymer layer 2 is laminated. Then, on the second conductive polymer layer 2, the third conductive polymer layer 3 is formed. As such, the first conductive polymer, the second conductive polymer and the third conductive polymer form the solid electrolyte 10.

The first conductive polymer and the second conductive polymer are synthesized by using a dopant of aromatic sulfonic acid, and the third conductive polymer is synthesized by using a dopant of polymeric sulfonic acid.

Figure 2:
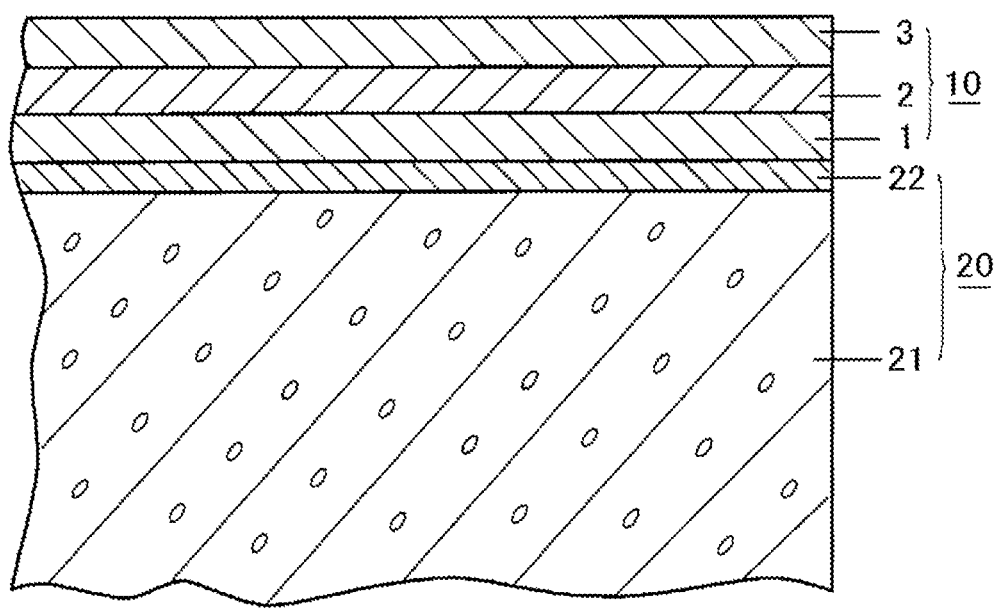
FIG. 2 is an illustration of a cross sectional view of another embodiment of the main part of the solid electrolytic capacitor of the present invention.

Also in the embodiment as shown in FIG. 2, one layer of the first conductive polymer layer 1 and one layer of the second conductive polymer layer 2 are illustrated. However, several layers of the first conductive polymer layer 1 and the second conductive polymer layer 2 can be laminated, if necessary.

Where several layers of the first conductive polymer layer 1 and the second conductive polymer layer 2 are laminated, the third conductive polymer layer 3 can be provided either on the second conductive polymer layer 2 or on the first conductive polymer layer 1.

As explained above, even in the embodiment in using the third conductive polymer, an aromatic sulfonic acid is used as a dopant in preparing the first conductive polymer and the second conductive polymer. This is because the aromatic sulfonic acid is preferable in the "polymerization on the spot." This is also because of producing a conductive polymer with high conductivity. The third conductive polymer is prepared by using a dopant of polymeric sulfonic acid. This is because it well serves as a dispersant during polymerization of the conductive polymer and produces a conductive polymer with high conductivity and good heat resistance.

EXAMPLES

Next, with reference to Examples, the present invention is explained more in detail. Note that the present invention is not limited to the Examples. The unit "%" for the concentration of the solution or dispersion liquid, or the unit "%" for the purity is based on mass %, unless otherwise provided.

Before explaining the Examples, Synthesis Examples are explained with respect to the alkylated ethylenedioxythiophene (i.e., ethylated ethylenedioxythiophene, propylated ethylenedioxythiophene, butylated ethylenedioxythiophene and methylated ethylenedioxythiophene) as Synthesis Examples 1 to 4. As Test Examples, the conductivity and the conductivity retention rate under high temperature storage were measured as to the conductive polymer which was obtained from a monomer of the ethylated ethylenedioxythiophene, propylated ethylenedioxythiophene, butylated ethylenedioxythiophene and methylated ethylenedioxythiophene, compared with those of the conductive polymer obtained from a monomer of ethylenedioxythiophene.

Synthesis Example 1

Synthesis of ethylated ethylenedioxythiophene (i.e., 2-ethyl-2,3-dihydro-thieno[3,4-b][1,4]dioxine)

Through the procedures 1-(1) to 1-(3), the ethylated ethylenedioxythiophene was prepared.

1-(1) Synthesis of butane-1,2-diyl-bis(4-methylbenzene sulfonate)

Under ice cooling condition, a reaction vessel was charged with tosyl chloride (14.25 kg; 73.28 moles) and 1,2-dichloroethane (16 kg). The mixture was stirred until the temperature inside the vessel became 10° C., and then, triethylamine (9.36 kg; 91.6 moles) were dropped therein.

While stirring the mixture and controlling not to exceed the temperature inside the vessel above 40° C., 1,2-butanediol (3.36 kg; 36.64 moles) was cautiously dropped over the period of 60 minutes. While the temperature inside the vessel keeping 40° C., the mixture was stirred for 6 hours. The reacted mixture was cooled to room temperature, into which water (5 kg) was put with stirring, and then, it was kept still.

The reacted mixture was divided into an aqueous phase and an organic phase. The organic phase was concentrated to obtain black red oily substance. Under ice cooling condition, a reaction vessel was charged with methanol (1.25 kg) and stirred, into which the black red oily substance was dropped with stirring to obtain a precipitation of white solids by filtration. The white solids were washed with a small amount of methanol and dried to obtain a product, i.e., butane-1,2-diyl-bis(4-methylbenzene sulfonate) (12.05 kg). The yield based on solid contents was 82%.

1-(2) Synthesis of 2-ethyl-2,3-dihydro-thieno[3,4-b][1,4]dioxine-5,7-dicarboxylic acid A reaction vessel was charged with disodium-2,5-bis(alkoxycarbonyl)thiophene-3,4-diolate (250 g; 0.9 moles), into which butane-1,2-diyl-bis(4-methylbenzene sulfonate) (725 g; 1.82 moles) as obtained in Procedure 1-(1), potassium carbonate (29 g; 0.27 moles) and dimethylacetamide (1 kg) were added. The inside of the vessel was kept at a temperature of 125° C., while the mixture was stirred for 4 hours.

The reacted mixture was concentrated, and the remains were brown solids, which were put into a 5% aqueous solution of sodium hydrogen carbonate ($NaHCO_3$; 1.8 kg) with stirring for 15 minutes at room temperature to collect brown solids.

Into a reaction vessel, the collected brown solids and a 7% aqueous solution of sodium hydroxide (1.25 kg) were charged. The inside of the vessel was kept at 80° C. with stirring for 2 hours.

The mixture in the vessel was cooled to room temperature. While the inside of the vessel was controlled not to exceed a temperature of 30° C., 98% sulfuric acid (455 g) was carefully dropped into the reaction completion liquid. While the temperature inside the vessel was kept at 80° C., the mixture was stirred for 2 hours.

The mixture in the vessel was cooled to room temperature with stirring to obtain gray solids as precipitation. Then, the reacted mixture was filtered to collect gray solids. The gray solids were washed with a small amount of water and dried to obtain a product, 2-ethyl-2,3-dihydro-thieno[3,4-b][1,4]dioxine-5,7-dicarboxylic acid (128 g). The yield based on solid contents was 54%.

1-(3) Synthesis of ethylated ethylenedioxythiophene

Thereby obtained 2-ethyl-2,3-dihydro-thieno[3,4-b][1,4]dioxine-5,7-dicarboxylic acid (obtained in Procedure 1-(2); 500 g; 1.94 moles) was dissolved in a reaction vessel into dimethyl formamide (1 kg). Then, copper oxide (102 g) was added. The inside of the vessel was kept at 125° C. while the mixture was stirred for 5.5 hours.

Dimethyl formamide was concentrated, and then, ethylene glycol (1.7 kg) was added. The temperature of the mixture was gradually raised and starts distillation at an inside pressure of 20 hpa. After water and an initial fraction were distilled, a main fraction including ethylene glycol (1.82 kg) was distilled.

To the main fraction as obtained, a 10% aqueous solution of sodium hydroxide (1 kg) was added. The temperature inside the vessel was kept at 100° C. with stirring for 2 hours. The solution had two phases which was divided. The lower phase with yellow clear liquid was a target product, i.e., ethylated ethylenedioxythiophene (130 g). The yield was 39%.

Synthesis Example 2

Synthesis of propylated ethylenedioxythiophene (i.e., 2-propyl-2,3-dihydro-thieno[3,4-b][1,4]dioxine)

Next, through the Procedures 2-(1) to 2-(3), propylated ethylenedioxy thiophene was synthesized.

2-(1): Synthesis of pentane-1,2-diyl-bis(4-methylbenzene sulfonate)

Under ice cooling condition, a reaction vessel was charged with tosyl chloride (5.89 kg; 30 moles) and 1,2-dichloroethane (7.30 kg). The mixture was stirred until the temperature inside the vessel became 10° C., into which triethylamine (3.83 kg; 37.5 moles) was dropped.

While the mixture was stirred and the temperature inside the vessel was controlled not to exceed 40° C., 1,2-pentanediol (1.56 kg; 15 moles) was carefully dropped over the period of 60 minutes. While the temperature inside the vessel was kept at 40° C., the mixture was stirred for 6 hours. Then, the reacted mixture was cooled to room temperature, into which water (3 kg) was added with stirring, and then, it was kept still.

The reacted mixture was divided into two phases, i.e., an aqueous phase and an organic phase. The organic phase was concentrated to obtain black red oily substance. Under ice cooling condition, a reaction vessel was charged with a mixture (550 g) of water and methanol at a mass ratio of 1:2, with stirring. Then, the black red oily substance as obtained above was dropped, and a precipitation of white solids was filtered out. The white solids was washed with a small amount of methanol and dried to obtain a product, i.e., pentane-1,2-diyl-bis(4-methyl benzene sulfonate) (3.77 kg). The yield based on solid contents was 60%.

2-(2): Synthesis of 2-propyl-2,3-dihydro-thieno[3,4-b][1,4]dioxine-5,7-dicarboxylic acid A reaction vessel was charged with disodium-2,5-bis(alkoxycarbonyl)thiophene-3,4-diolate (1.18 kg; 3.88 moles) and pentane-1,2-diyl-bis(4-methylbenzene sulfonate) (2.80 kg; 6.79 moles) as obtained above, potassium carbonate (107 g; 0.77 moles), and dimethyl formamide (5 kg). The temperature inside the vessel was kept at 120° C. while the mixture was stirred for 4 hours.

The reacted mixture was concentrated, and the remains were brown solids, which were added to a 5% aqueous solution of sodium hydrogen carbonate (5 kg). The mixture was stirred at room temperature for 15 minutes and filtered out to obtain the brown solids.

A reaction vessel was charged with the filtered brown solids and a 7% aqueous solution of sodium hydroxide (5.32 kg). The temperature inside the vessel was kept at 80° C. while the stirring was continued for 2 hours.

The mixture in the vessel was cooled to room temperature. While the temperature inside the vessel was controlled not to exceed 30° C., 98% sulfuric acid was carefully added to the reaction completion liquid. While the temperature inside the vessel was kept at 80° C., the stirring was continued for 2 hours.

The mixture in the vessel was cooled to room temperature with stirring, while a precipitation of gray solids was filtered. Then, the reacted mixture was cooled and the gray solids were filtered. The gray solids were washed with a small amount of water and dried to obtain a target product, i.e., 2-propyl-2,3- dihydro-thieno[3,4-b][1,4]dioxine-5,7-dicarboxylic acid (727 g). The yield based on solid contents was 68%.

2-(3): Synthesis of propylated ethylenedioxythiophene

Into a reaction vessel, the 2-propyl-2,3-dihydro-thieno[3,4-b][1,4]dioxin-5,7-dicarboxylic acid (1.12 kg; 4.1 moles) as obtained in Procedure 2-(2) was dissolved in dimethyl formamide (1.2 kg), into which copper oxide (227 g) was added. The temperature inside the vessel was kept at 125° C. while the mixture was stirred for 5.5 hours.

Dimethyl formamide was concentrated, and ethylene glycol (700 g) was added. The temperature of the mixture was gradually raised at an inside pressure of 20 hpa for distillation. After water and an initial fraction were distilled, a main fraction including ethylene glycol (900 g) was distilled.

Into the main fraction as obtained, a 10% aqueous solution of sodium hydroxide (1 kg) was added. The temperature inside the vessel was kept at 100° C. The mixture was stirred for 2 hours, and then, it was kept still.

The solution with two phases was divided. The lower phase was yellow clear liquid, that is, a target product of propylated ethylenedioxythiophene (180 g). The yield was 24%.

Synthesis Example 3

Synthesis of butylated ethylenedioxythiophene (i.e., 2-butyl-2,3-dihydro-thieno[3,4-b][1,4]dioxine)

Through the Procedures 3-(1) to 3-(3), butylated ethylenedioxythiophene was synthesized.

3-(1): Synthesis of pentane-1,2-diyl-bis(4-methylbenzene sulfonate)

Under ice cooling condition, a reaction vessel was charged with tosyl chloride (5.89 kg; 30 moles) and 1,2-dichloroethane (7.3 kg). The temperature inside the vessel reached 10° C. with stirring, into which triethylamine (3.83 kg; 37.5 moles) was dropped.

While the mixture was stirred and the temperature inside the vessel was controlled not to exceed 40° C., 1,2-hexanediol (1.77 kg; 15 moles) was carefully dropped over the period of 60 minutes. The temperature inside the vessel was kept at 40° C. The mixture was stirred for 6 hours.

The reacted mixture was cooled to reach room temperature, and then, water (3 kg) was added with stirring. Then, it was kept still. The reacted mixture was divided into two phases, i.e., an aqueous phase and an organic phase. The organic phase was concentrated to obtain black red oily substance.

Under ice cooling condition, a reaction vessel was charged with 550 g of a mixture liquid of water and methanol at a mass ratio of 1:2, with stirring. There, the black red oily substance as obtained above was dropped with stirring. A precipitation of white solids was collected by filtration. The white solids were washed with a small amount of methanol and dried to obtain a target product, i.e., hexane-1,2-diyl-bis(4-methylbenzene sulfonate) (3.52 kg). The yield based on solid contents was 55%.

3-(2): Synthesis of 2-butyl-2,3-dihydro-thieno[3,4-b][1,4]dioxine-5,7-dicarboxylic acid A reaction vessel was charged with disodium-2,5-bis(alkoxycarbonyl)thiophene-3,4-diolate (1.18 kg; 3.88 moles), hexane-1,2-diyl-bis(4-methyl benzene sulfonate) (2.9 kg; 6.79 moles) as obtained in Procedure 3-(1) above, potassium carbonate (107 g; 0.77 moles), and dimethyl formamide (5 kg). The temperature inside the vessel was kept at 120° C. The mixture was stirred for 4 hours.

The reacted mixture was concentrated. The remains were brown solids, into which a 5% aqueous solution of sodium hydrogen carbonate (5 kg) was added. The mixture was stirred at room temperature for 15 minutes. The brown solids were collected by filtration. Into a reaction vessel, the filtered brown solids and a 7% aqueous solution of sodium hydroxide (5.32 kg) were added. The temperature inside the vessel was kept at 80° C. The mixture was stirred for 2 hours.

The mixture in the vessel was cooled and reached room temperature. While the temperature inside the vessel was controlled not to exceed 30° C., 98% sulfuric acid (759 g) was carefully dropped into the reaction completion liquid. The temperature inside the vessel was kept at 80° C. The mixture was stirred for 2 hours.

The mixture in the vessel was cooled and reached room temperature while stirring. A precipitation of gray solids was collected by filtration. Then, the reacted mixture was cooled. The gray solids were collected by filtration. The gray solids were washed with a small amount of water, and dried to obtain a target product, i.e., 2-butyl-2,3-dihydro-thieno[3,4-b][1,4]dioxine-5,7-dicarboxylic acid (689 g). The yield based on solid contents was 62%.

3-(3): Synthesis of butylated ethylenedioxythiophene 2-butyl-2,3-dihydro-thieno[3,4-b][1,4]dioxine-5,7-dicarboxylic acid (1.18 kg; 4.11 moles) as obtained in the Procedure 3-(2) was put inside a reaction vessel to dissolve in 1.2 kg of dimethyl formamide. Then, copper oxide (227 g) was added. The temperature inside the vessel was kept at 125° C. The mixture was stirred for 5.5 hours.

Next, the dimethyl formamide was concentrated. Ethylene glycol (700 g) was added. The temperature of the reaction mixture was gradually raised at an inner pressure of 20 hpa. After water and an initial fraction were distilled, a main fraction (900 g) including ethylene glycol was distilled.

Into the main fraction as obtained, a 10% aqueous solution of sodium hydroxide was added. The temperature inside the vessel was kept at 100° C. The mixture was stirred for 2 hours, and then, it was kept still.

The solution had two phases which was divided. The lower phase was yellow clear liquid, that is, a target product of butylated ethylenedioxythiophene (130 g). The yield was 16%.

Synthesis Example 4

Synthesis of methylated ethylenedioxythiophene (i.e., 2-methyl-2,3-dihydro-thieno[3,4-b][1,4]dioxine)

Through the Procedures 4-(1) to 4-(3) below, methylated ethylenedioxythiophene was synthesized.

4-(1): Synthesis of propane-1,2-diyl-bis(4-methylbenzene sulfonate)

Under ice cooling condition, a reaction vessel was charged with tosyl chloride (7.86 kg; 40 moles) and 1,2-dichloroethane (7 kg). The temperature inside the vessel reached 10° C. with stirring. There, triethylamine (5.11 kg; 50 moles) was dropped.

While the mixture above was stirred and the temperature inside the vessel was controlled not to exceed 40° C., 1,2-propanediol (1.55 kg; 20 moles) was carefully dropped into the mixture over the period of 60 minutes. The temperature inside the vessel was kept at 40° C. The mixture was stirred for 6 hours.

The reacted mixture was cooled to room temperature. Water (4 kg) was added with stirring, and then, it was kept still. The reacted mixture was divided into two phases, i.e., an aqueous phase and an organic phase. The organic phase was concentrated to produce black red oily substance.

Under ice cooling condition, a reaction vessel was charged with methanol (500 g) with stirring, into which the black red oily substance as obtained above was dropped. A precipitation of white solids was collected by filtration. The white solids were washed with a small amount of methanol, and then, dried to obtain a target product of propane-1,2-diyl-bis (4-methyl benzene sulfonate) (3.87 kg). The yield based on solid contents was 50%.

4-(2): Synthesis of 2-methyl-2,3-dihydro-thieno[3,4-b][1,4]dioxine-5,7-dicarboxylic acid Into a reaction vessel, disodium-2,5-bis(alkoxycarbonyl) thiophene-3,4-diolate (508 g; 1.67 moles), propane-1,2-diyl-bis(4-methylbenzene sulfonate) (960 g; 2.5 moles) as obtained in Procedure 4-(1) above, potassium carbonate (46 g; 0.33 moles) and dimethyl formamide (2.5 kg) were charged. The temperature inside the vessel was kept at 120° C. The mixture was stirred for 4 hours.

The reacted mixture was concentrated, and the remains were brown solids. There, a 5% aqueous solution of sodium hydrogen carbonate (3.7 kg) was added. After stirring the mixture at room temperature for 15 minutes, the brown solids were collected by filtration. Into a reaction vessel, the filtered brown solids were added to a 7% aqueous solution of sodium hydroxide (2.47 kg). The temperature inside the vessel was kept at 80° C. The mixture was stirred for 2 hours.

The mixture in the vessel was cooled to reach room temperature. While the temperature inside the vessel was controlled not to exceed 30° C., 98% sulfuric acid (759 g) was carefully dropped into the reaction completion liquid. The temperature inside the vessel was kept at 80° C. The mixture was stirred for 2 hours.

The mixture in the vessel was cooled with stirring to reach room temperature. A precipitation of gray solids was collected by filtration. Then, the reacted mixture was cooled to collect the gray solids by filtration. The gray solids were washed with a small amount of water, and then, dried to obtain a target product, i.e., 2-methyl-2,3-dihydro-thieno[3,4-b][1,4]dioxine-5,7-dicarboxylic acid (310 g). The yield based on solid contents was 76%.

4-(3): Synthesis of methylated ethylenedioxythiophene (i.e., 2-methyl-2,3-dihydro-thieno[3,4-b][1,4]dioxine)

2-methyl-2,3-dihydro-thieno[3,4-b][1,4]dioxine-5,7-dicarboxylic acid (880 g; 3.6 moles) as obtained in Procedure 4-(2) was put into a reaction vessel to dissolve into 3 kg of polyethylene glycol 300 (Manufacture by Hayashi Pure Chemical IND., LTD), into which copper oxide (176 g) was added. The temperature of the mixture was gradually raised at an inner pressure of 20 hpa for distillation. After water and an initial fraction were distilled, a main fraction including polyethylene glycol 300 was obtained. There, 400 g of water was added with stirring, and then, it was kept still.

The solution had two phases, which were divided. The lower phase was yellow clear liquid, that was a target product, i.e., methylated ethylenedioxythiophene (343 g). The yield was 60%.

TEST EXAMPLES

Each of ethylated ethylenedioxythiophene, propylated ethylenedioxythiophene, butylated ethylenedioxythiophene, methylated ethylenedioxythiophene and ethylenedioxythiophene were used as a monomer to produce a conductive polymer, and the properties thereof were compared.

As an oxidant and dopant agent, a 40% n-butanol solution of iron paratoluene sulfonate (Manufacture by Tayca Corporation; the iron paratoluene sulfonate includes paratoluene sulfonic acid and iron at mole ratio of 2.8:1) was used. Into each of 60 µl of the ethylated ethylenedioxythiophene, propylated ethylenedioxythiophene, butylated ethylenedioxythiophene, methylated ethylenedioxythiophene and ethylenedioxythiophene, the 40% n-butanol solution of iron paratoluene sulfonate (500 µl) was added with fully stirring. There initiates a chemical oxidative polymerization of the monomer. Immediately thereafter, 180 µl of each of them were dropped on a ceramics plate with a size of 3 cm×5 cm such that it is polymerized under a relative humidity of 60% at a temperature of 25° C. for 3 hours. Then, the ceramics plate was immersed into water for washing. Then, it was dried at 150° C. for 24 hours so as to provide a sheet of conductive polymer formed on the ceramics plate, including a dopant of paratoluene sulfonic acid.

Next, the sheet of the conductive polymer on the ceramics plate was applied to a load of 1.5 tons and stayed for 5 minutes to evenly apply the pressure to the sheet. Then, the conductivity of the conductive polymer was measured by using a four probe method measurer (manufactured by Mitsubishi Chemical Corporation; MCP-T600). The results are shown in Table 1.

After measurement of the conductivity, the conductive polymer sheets were stored in a constant-temperature bath at 150° C. in a still state. After 48 hours, the conductivity was again measured to obtain a conductivity retention rate. The results thereof are also shown in Table 1. Note that in Table 1, the monomers to synthesize the conductive polymer are shown, but for simplification, "ethylated ethylenedioxythiophene" is identified by "ethylated EDOT"; "propylated ethylenedioxythiophene" is identified by "propylated EDOT"; "butylated ethylenedioxythiophene" is identified by "butylated EDOT"; "methylated ethylenedioxythiophene" is identified by "methylated EDOT"; and "ethylenedioxythiophene" is identified by "EDOT."

Note that the conductivity retention rate was obtained by dividing the post-conductivity by the initial conductivity (i.e., the conductivity measured before the storage in the constant-temperature bath at 150° C.), using in the unit of percent (%). This calculation is shown by the formula below. The higher the retention rate is, the less the conductivity tends to decrease and more excellent its heat resistance is.

"The conductivity retention rate(%)"=(post-conductivity)/(initial conductivity)×100    Calculation Formula 1

TABLE 1

| Monomer | Conductivity (S/cm) | conductivity retention rate (%) |
|---|---|---|
| ethylated EDOT | 189 | 37 |
| propylated EDOT | 182 | 32 |

TABLE 1-continued

| Monomer | Conductivity (S/cm) | conductivity retention rate (%) |
|---|---|---|
| butylated EDOT | 170 | 29 |
| methylated EDOT | 140 | 49 |
| EDOT | 102 | 75 |

As shown in Table 1, when the monomers were ethylated EDOT (i.e., ethylated ethylenedioxythiophene), propylated EDOT (i.e., propylated ethylenedioxythiophene), butylated EDOT (i.e., butylated ethylenedioxythiophene) and methylated EDOT (i.e., methylated ethylenedioxythiophene) to synthesize the conductive polymers, they had a higher conductivity and more excellent than the conductive polymer obtained by using a monomer of EDOT (i.e., ethylenedioxythiophene). However, when alkylated ethylenedioxythiophene was used as a monomer to synthesize the conductive polymer, it had a lower conductivity retention rate and a lower heat resistance than that obtained from ethylenedioxythiophene as a monomer.

[Evaluation of Tantalum Solid Electrolytic Capacitor]

Example 1

In Example 1 and Examples 2 to 6 discussed later, tantalum solid electrolytic capacitors were produced to evaluate their properties. First of all, the production of the tantalum solid electrolytic capacitors is explained.

A tantalum sintered body was immersed in a 0.1% phosphoric acid aqueous solution while the tantalum sintered body was applied to a 20V voltage for chemical conversion treatment, so as to form a dielectric layer of a tantalum oxidation film on the surface of the tantalum sintered body, which was provided as a capacitor element.

Next, the capacitor element was immersed in a 35 v/v % ethylated ethylenedioxythiophene solution (ethanol solution) for 1 minute, and then, it was taken out and kept still for five minutes. Then, the capacitor element was immersed in an oxidant and dopant solution with an emulsifier, that is, a mixture of a 60% 2-methylimidazolium phenol sulfonate aqueous solution (pH5), a 40% ammonium persulfate aqueous solution and a 20% dodecylamine oxide aqueous solution at a mass ratio of 200:200:1. After 30 seconds, it was taken out and kept still at room temperature for 10 minutes, and it was heated at 70° C. for 10 minutes for polymerization. Then, it was immersed in water and kept for 30 minutes. Then, it was taken out and dried at 70° C. for 30 minutes. These procedures were repeated one more time to provide a first conductive polymer layer. Regarding the oxidant and dopant solution including the emulsifier, the emulsifier was dodecyl amine oxide, the oxidant was ammonium persulfate, and the dopant was phenol sulfonic acid.

Next, the capacitor element having formed the first conductive polymer on the dielectric layer was immersed in a 35 v/v % ethylenedioxythiophene solution (ethanol solution). After 1 minute, it was taken out and kept it for 5 minutes. Then, the capacitor element was immersed in an oxidant and dopant solution including an emulsifier as discussed before. After 30 seconds, it was taken out and kept at room temperature for 10 minutes. Then, it was heated at 70° C. for 10 minutes for polymerization. Then, it was immersed in pure water, and kept still for 30 minutes. Then, it was taken out and dried at 70° C. for 30 minutes. Then, these procedures were repeated one more time to provide a second conductive polymer layer.

The formation of the first conductive polymer layer and the formation of the second conductive polymer layer were alternatively repeated three times, so as to form a solid electrolyte including the first conductive polymer and the second conductive polymer. Then, the solid electrolyte is coated with a carbon paste and a silver paste to provide an exterior package, thereby obtaining a tantalum solid electrolytic capacitor. In the construction of the solid electrolyte, the "polymerization on the spot" was performed 12 times in total by repeating 6 times of the synthesis of the first conductive polymer and 6 times of synthesis of the synthesis of the second conductive polymer.

That is, the solid electrolytic capacitor of Example 1 had from the side of the dielectric layer of the capacitor element, the first conductive polymer layer made of the ethylated ethylenedioxythiophene monomer ("polymerization on the spot": twice performed); the second conductive polymer layer made of the ethylenedioxythiophene monomer ("polymerization on the spot": twice performed), the first conductive polymer layer made of the ethylated ethylenedioxythiophene monomer ("polymerization on the spot": twice performed); the second conductive polymer layer made of the ethylenedioxythiophene monomer ("polymerization on the spot": twice performed); the first conductive polymer layer made of the ethylated ethylenedioxythiophene monomer ("polymerization on the spot": twice performed); and the second conductive polymer layer made of the ethylenedioxythiophene monomer ("polymerization on the spot": twice performed), that were formed in the order, so as to provide the solid electrolyte including the first conductive polymer and the second conductive polymer.

Example 2

Instead of the 35 v/v % ethylated ethylenedioxythiophene solution (ethanol solution) in synthesis of the first conductive polymer, a 35 v/v % propylated ethylenedioxythiophene solution (ethanol solution) was used. Other than that, the same procedure as Example 1 was performed to provide a tantalum solid electrolytic capacitor.

That is, the solid electrolytic capacitor of Example 2 included from the side of the dielectric layer of the capacitor element, the first conductive polymer layer made of the propylated ethylenedioxythiophene monomer ("polymerization on the spot": twice performed); the second conductive polymer layer made of the ethylenedioxythiophene monomer ("polymerization on the spot": twice performed); the first conductive polymer layer made of the propylated ethylenedioxythiophene monomer ("polymerization on the spot": twice performed); the second conductive polymer layer made of the ethylenedioxythiophene monomer ("polymerization on the spot": twice performed); the first conductive polymer layer made of the propylated ethylenedioxythiophene monomer ("polymerization on the spot": twice performed); and the second conductive polymer layer made of the ethylenedioxythiophene monomer ("polymerization on the spot": twice performed), that were formed in the order, so as to provide the solid electrolyte including the first conductive polymer and the second conductive polymer.

Example 3

As a monomer, ethylated ethylenedioxythiophene was used to perform the "polymerization on the spot" (one time performed) in the same manner as Example 1 to provide a first conductive polymer layer. On the first conductive polymer layer, using a monomer of ethylenedioxythiophene, the "polymerization on the spot" (one time performed) in the same manner as Example 1 was conducted to provide a second conductive polymer layer. Then, the formations of the first conductive polymer layer and the second conductive polymer layer were alternatively repeated five more times, so as to provide a solid electrolyte including the first conductive polymer and the second conductive polymer. Then, the procedure similar to Example 1 was performed to produce a tantalum solid electrolytic capacitor.

That is, the solid electrolytic capacitor of Example 3 included from the side of the dielectric layer of the capacitor element, six layers of the first conductive polymer layer made of the ethylated ethylenedioxythiophene monomer and six laminations of the second conductive polymer layer made of the ethylenedioxythiophene monomer, so as to provide a solid electrolyte including the first conductive polymer and the second conductive polymer alternatively laminated.

Example 4

As a monomer, ethylated ethylenedioxythiophene was used. The "polymerization on the spot" was repeated twice in a similar manner to Example 1 to provide a first conductive polymer layer. On the first conductive polymer layer, a monomer of ethylenedioxythiophene was used, and the "polymerization on the spot" in a similar manner to Example 1 was repeated twice to provide a second conductive polymer. On the second conductive polymer layer, the first conductive polymer was prepared through the "polymerization on the spot" twice to provide the second lamination of the first conductive polymer layer. On the latest first conductive polymer layer, the second conductive polymer was synthesized through the "polymerization on the spot" six times to provide the second lamination of the second conductive polymer layer. As such, a solid electrolyte was formed from the first conductive polymer and the second conductive polymer. Then, the procedure same as Example 1 was performed to provide a tantalum solid electrolytic capacitor.

That is, the solid electrolytic capacitor of Example 4 included from the side of the dielectric layer of the capacitor element; the first conductive polymer layer made of the ethylated ethylenedioxythiophene monomer ("polymerization on the spot": twice performed); the second conductive polymer layer made of the ethylenedioxythiophene monomer ("polymerization on the spot": twice performed); the first conductive polymer layer made of the ethylated ethylenedioxythiophene monomer ("polymerization on the spot": twice performed); and the second conductive polymer layer made of the ethylenedioxythiophene monomer ("polymerization on the spot": six times performed), so as to provide a solid electrolyte including the first conductive polymer and the second conductive polymer, alternatively laminated.

Example 5

A tantalum sintered body was immersed in a 0.1% phosphoric acid aqueous solution, while the tantalum sintered body was applied to a 20V voltage to perform a chemical conversion treatment. Thereby, on the surface of the tantalum sintered body, a dielectric layer of a tantalum oxidation film was formed to provide a capacitor element.

The capacitor element was immersed in a 25 v/v % ethylated ethylenedioxythiophene solution (ethanol solution). After one minute, it was taken out and kept still for 5 minutes. Then, it was immersed in a 40% ethanol solution of iron paratoluene sulfonate, which had been prepared in advance. After 30 seconds, it was taken out and kept still at room temperature for 80 minutes. Accordingly, through the "polymerization on the spot," a first conductive polymer was synthesized. Then, the capacitor element was immersed in ethanol. After 30 minutes, it was kept still, and then, it was taken out, and dried at 70° C. for 30 minutes. These procedures were repeated one more time to provide the first conductive polymer layer.

Next, the capacitor element having formed the first conductive polymer layer on the dielectric layer was immersed in a 25 v/v % ethylenedioxythiophene solution (ethanol solution). After one minute, it was taken out, and kept still for 5 minutes. Then, it was immersed in a 40% ethanol solution of iron paratoluene sulfonate. After 30 minutes, it was taken out, and kept still at room temperature for 80 minutes. Thereby, through the "polymerization on the spot," the second conductive polymer was synthesized. Then, the capacitor element was immersed in ethanol. After 30 minutes, it was taken out and dried at 70° C. for 30 minutes. These procedures were repeated one more time to provide a second conductive polymer layer.

Then, the formations of the first conductive polymer layer and the second conductive polymer layer were alternatively repeated twice to form a solid electrolyte including the first conductive polymer and the second conductive polymer. Then, the procedure similar to Example 1 was performed to provide a tantalum solid electrolytic capacitor.

That is, the solid electrolytic capacitor of Example 5 included from the dielectric layer of the capacitor element, the first conductive polymer layer made of the ethylated ethylenedioxythiophene monomer ("polymerization on the spot": twice performed); the second conductive polymer layer made of the ethylenedioxythiophene monomer ("polymerization on the spot": twice performed); the first conductive polymer layer made of the ethylated ethylenedioxythiophene monomer ("polymerization on the spot": twice performed); the second conductive polymer layer made of the ethylenedioxythiophene monomer ("polymerization on the spot": twice performed); the first conductive polymer layer made of the ethylated ethylenedioxythiophene monomer ("polymerization on the spot": twice performed); and the second conductive polymer layer made of the ethylenedioxythiophene monomer ("polymerization on the spot": twice performed), so as to provide a solid electrolyte including the first conductive polymer and the second conductive polymer, alternatively laminated.

Example 6

Instead of using the 35 v/v % ethylated ethylenedioxythiophene solution (ethanol solution) in the synthesis of the first conductive polymer, a 35 v/v % methylated ethylenedioxythiophene solution (ethanol solution) was used. Other than that, the same procedure as Example 1 was performed to produce a tantalum solid electrolytic capacitor.

That is, the solid electrolytic capacitor of Example 6 included from the side of the dielectric layer of the capacitor element, the first conductive polymer layer made of the methylated ethylenedioxythiophene monomer ("polymerization on the spot": twice performed); the second conductive polymer layer made of the ethylenedioxythiophene monomer ("polymerization on the spot": twice performed); the first conductive polymer layer made of the methylated ethylenedioxythiophene monomer ("polymerization on the spot": twice performed); the second conductive polymer layer made of the ethylenedioxythiophene monomer ("polymerization on the spot": twice performed); the first conductive polymer layer made of the methylated ethylenedioxythiophene monomer ("polymerization on the spot": twice performed); and the second conductive polymer layer made of the ethylenedioxythiophene monomer ("polymerization on the spot": twice performed), so as to provide a solid electrolyte including the first conductive polymer and the second conductive polymer alternatively laminated.

Comparative Example 1

Instead of using the 35 v/v % ethylated ethylenedioxy thiophene solution (ethanol solution), a 35 v/v % ethylenedioxy thiophene solution (ethanol solution) was used. Other than that, the same procedure as Example 1 was performed to produce a tantalum solid electrolytic capacitor.

That is, in case of the tantalum solid electrolytic capacitor of Comparative Example 1, ethylenedioxythiophene was polymerized 12 times through the "polymerization on the spot." The whole of the solid electrolyte was made of the ethylenedioxythiophene monomer as the second conductive polymer.

Comparative Example 2

A 35 v/v % ethylated ethylenedioxythiophene solution (ethanol solution) alone was used, and the "polymerization on the spot" was performed 12 times. Other than that, the same procedure as Example 1 was performed to produce a tantalum solid electrolytic capacitor.

That is, the tantalum solid electrolytic capacitor of Comparative Example 2 included the solid electrolyte in which the whole of the monomer was ethylated ethylenedioxythiophene to provide the first conductive polymer.

Comparative Example 3

A 35 v/v % of propylated ethylenedioxythiophene solution (ethanol solution) alone was used and the "polymerization on the spot" was conducted 12 times. Other than that, the same procedure as Example 1 was performed to produce a tantalum solid electrolytic capacitor.

That is, the tantalum solid electrolytic capacitor of Comparative Example 3 included the solid electrolyte in which the whole of the monomers was propylated ethylenedioxythiophene to provide the first conductive polymer.

Comparative Example 4

Instead of using the 25 v/v % ethylated ethylenedioxythiophene solution (ethanol solution), a 25 v/v % ethylenedioxythiophene solution (ethanol solution) was used, and the "polymerization on the spot" was performed 12 times. Other than that, the same procedure as Example 5 was performed to produce a tantalum solid electrolytic capacitor.

That is, the tantalum solid electrolytic capacitor of Comparative Example 4 included the solid electrolyte in which the whole of the monomer was ethylenedioxy thiophene to provide the second conductive polymer.

Also, both of the tantalum solid electrolytic capacitors of Comparative Example 4 and Comparative Example 1 included the solid electrolyte made from the ethylenedioxythiophene monomer alone as the second conductive polymer. However, Comparative Example 1 was different from Comparative Example 4 as follows: In the tantalum solid electrolytic capacitor of Comparative Example 1, phenol sulfonic acid was used as a dopant, and ammonium persulfate was used as an oxidant, so as to perform the oxidation polymerization. In the tantalum solid electrolytic capacitor of Comparative Example 4, paratoluene sulfonic acid was used as a dopant, and ethylenedioxythiophene was used as an oxidant, so as to perform the oxidation polymerization.

Comparative Example 5

A 25 v/v % propylated ethylenedioxythiophene solution (ethanol solution) alone was used, and the "polymerization on the spot" was performed 12 times. Other than that, the same procedure as Example 5 was performed to produce a tantalum solid electrolytic capacitor.

That is, the tantalum solid electrolytic capacitor of Comparative Example 5 included the solid electrolyte in which the whole of the monomer was propylated ethylenedioxythiophene to provide the first conductive polymer.

Both of the tantalum solid electrolytic capacitor of Comparative Example 5 and Comparative Example 3 included the solid electrolyte made from the propylated ethylenedioxythiophene monomer alone so as to form the first conductive polymer. However, Comparative Example 3 was different from Comparative Example 5 as follows: In the tantalum solid electrolytic capacitor of Comparative Example 3, phenol sulfonic acid was used as a dopant, and ammonium persulfate was used as an oxidant, so as to perform the oxidation polymerization of the propylated ethylenedioxythiophene. In the tantalum solid electrolytic capacitor of Comparative Example 5, paratoluene sulfonic acid was used as a dopant, and iron was used as an oxidant, so as to perform the oxidation polymerization of the propylated ethylenedioxythiophene.

Comparative Example 6

A 35 v/v % methylated ethylenedioxythiophene solution (ethanol solution) alone was used, and the "polymerization on the spot" was performed 12 times. Other than that, the same procedure as Example 1 was performed to produce a tantalum solid electrolytic capacitor.

That is, the tantalum solid electrolytic capacitor of Comparative Example 6 included the solid electrolyte in which the whole of the monomer was methylated ethylenedioxythiophene to provide the first conductive polymer.

With respect to the tantalum solid electrolytic capacitors as produced in Examples 1 to 6 and Comparative Examples 1 to 6, the ESR value and the capacitance were measured. The results are shown in Table 2. The methods for measuring the ESR value and the capacitance are described as follows: In measuring the ESR, LCR Meter (4284 A) manufactured by HEWLETT HEWLEWTT PACKARD was used under the condition of 25° C. and 100 kHz. In measuring the capacitance, LCR Meter (4284 A) manufactured by HEWLETT PACKARD was used under the condition of 25° C. and 120 Hz. The measurements were conducted on 10 samples of each Example. The results of ESR on Table 2 were obtained by averaging the values of the 10 samples while rounding off to one decimal place. The results of capacitance were obtained by averaging the values of the 10 samples while rounding off the numbers after the decimal point.

Also, with respect to the tantalum solid electrolytic capacitors of Examples 1 to 6 and Comparative Examples 1 to 6, the leak current was measured to find the occurrence of the defect of leak current. The results are shown in Table 2. The measurement methods of the leak current and the occurrence of the defect of leak current are described as follows.

[Leak Current]

To the tantalum solid electrolytic capacitor, a rated voltage of 16V was applied at 25° C. for 60 seconds, and then, the leak current was measured by means of a digital oscilloscope.

[Occurrence of the Defect of Leak Current]

It is determined to have occurred the defect of leak current when the leak current was 100 μA or more during the measurement of the leak current.

Table 2 showing the results of the occurrence of the defect of leak current indicating "leak current defect occurrence number," in which the denominator is the total numbers of the capacitor tested, and the numerator is the numbers that there have found the occurrence of the defect of leak current.

TABLE 2

|  | ESR (mΩ) | Capacitance (μF) | leak current defect occurrence number (pieces) |
| --- | --- | --- | --- |
| Example 1 | 9.0 | 259 | 0/10 |
| Example 2 | 9.2 | 257 | 0/10 |
| Example 3 | 9.6 | 258 | 0/10 |
| Example 4 | 8.9 | 259 | 0/10 |
| Example 5 | 8.8 | 257 | 0/10 |
| Example 6 | 10.9 | 254 | 0/10 |
| Comparative Example 1 | 15.3 | 258 | 1/10 |
| Comparative Example 2 | 17.4 | 248 | 0/10 |
| Comparative Example 3 | 19.3 | 244 | 0/10 |
| Comparative Example 4 | 14.2 | 256 | 2/10 |
| Comparative Example 5 | 18.1 | 242 | 0/10 |
| Comparative Example 6 | 15.9 | 253 | 0/10 |

After measuring the properties above, the tantalum solid electrolytic capacitors of Examples 1 to 6 and Comparative Examples 1 to 6 (which are hereinafter referred to as "capacitor(s)" for simplification rather than referring to as "tantalum solid electrolytic capacitor(s)" of Examples 1 to 6 and Comparative Examples 1 to 6) were stored in a constant-temperature bath at 150° C. in a still state for 100 hours. Then, they were measured as to the ESR and the capacitance in the same manner before. The results are shown in Table 3.

TABLE 3

|  | ESR (mΩ) | Capacitance (μF) |
| --- | --- | --- |
| Example 1 | 9.9 | 257 |
| Example 2 | 9.9 | 255 |
| Example 3 | 10.4 | 256 |
| Example 4 | 9.6 | 257 |
| Example 5 | 9.6 | 255 |
| Example 6 | 12.1 | 251 |
| Comparative Example 1 | 16.9 | 256 |
| Comparative Example 2 | 33.4 | 242 |
| Comparative Example 3 | 45.2 | 238 |
| Comparative Example 4 | 16.8 | 254 |
| Comparative Example 5 | 43.9 | 236 |
| Comparative Example 6 | 17.9 | 251 |

As shown in Table 2, capacitors of Examples 1 to 6 had a lower ESR than those of Comparative Example 1. This shows that the former was more excellent than latter. That is, in Examples 1 to 6, alkylated ethylenedioxythiophene (i.e., 2-alkyl-2,3-dihydrothieno[3,4-b][1,4]dioxine) was used as a monomer to provide the first conductive polymer layer, and ethylenedioxythiophene (i.e., 2,3-dihydrothieno[3,4-b][1,4] dioxine) was used as a monomer to provide the second conductive polymer, and these were alternatively laminated to provide the capacitor of the solid electrolyte. On the other hand, in Comparative Example 1, ethylenedioxythiophene alone was used as a monomer to provide the second conductive polymer as the capacitor of the solid electrolyte. The former capacitors had a lower ESR than the latter capacitors. This means that the former capacitors were more excellent than the latter capacitors. This is considered because the first conductive polymer forming the solid electrolyte of the capacitor of Examples 1 to 6 had a higher conductivity than the second conductive polymer used as the solid electrolyte of the capacitor of Comparative Example 1.

Similar to Comparative Example 1, the capacitor of Comparative Example 4 was produced by using ethylenedioxythiophene as a monomer to produce the second conductive polymer layer alone serving as the solid electrolyte. While Comparative Example 4 was different from Comparative Example 1 in view of the dopant and oxidant, the capacitor of Comparative Example 4 had a higher ESR than the capacitors of Examples 1 to 6.

Note as follows: There are the capacitor of Comparative Example 2 in which the conductive polymer was prepared by using ethylated ethylenedioxythiophene as a monomer; the capacitor of Comparative Examples 3 and 5 in which the conductive polymer was prepared by using propylated ethylenedioxythiophene as a monomer; and the capacitor of Comparative Example 6 in which the conductive polymer was prepared by using methylated ethylenedioxythiophene as a monomer. These conductive polymers correspond to the first conductive polymer. There conductivity polymers were found excellent in the conductivity compared with the conductive polymers of Comparative Examples 1 and 4. See Table 1. Nonetheless, the capacitors of Comparative Examples 2 to 3 and 5 to 6 had a large ESR than the capacitors of Comparative Examples 1 and 4. This is considered because when laminating the conductive polymer several times, the contact resistance among the conductive polymers has increased more and more during the production of the capacitors, as seen by comparing Comparative Examples 2, 3, 5 and 6 with Comparative Examples 1 and 4.

Also, as shown in Table 3, the capacitors of Examples 1 to 6 had less increase of ESR under the high temperature storage than those of Comparative Examples 2, 3, 5 and 6. These results show that the former capacitors were more excellent in the heat resistance than the latter capacitors. Further as shown in Table 2, the capacitors of Examples 1 to 6 had found no occurrence of the leak current defect. On the other hand, the capacitors of Comparative Examples 1 and 4, in which the solid electrolyte including the second conductive polymer alone obtained from ethylenedioxythiophene as a monomer was used, had shown the occurrence of the leak current defect. The capacitor of Comparative Example 4, in which iron was used as oxidant, had more occurrence of the leak current defect than Comparative Example 1.

Example 7

In Examples 1 to 6, the "polymerization on the spot" was performed to alternatively laminate the first conductive polymer layer and the second conductive polymer layer, and thereby obtained conductive polymer alone was used as a solid electrolyte to produce a tantalum solid electrolytic capacitor. In Example 7 and Examples 8 to 11 discussed later, the first conductive polymer layer and the second conductive polymer layer were alternatively laminated to provide a conductive polymer layer, on which another conductive polymer, i.e., the third conductive polymer layer was formed such that the first, the second and the third conductive polymers serve as a solid electrolyte to produce a tantalum solid electrolytic capacitor, and then, their properties were evaluated.

First, a dispersion liquid including a conductive polymer was prepared, in order to form the third conductive polymer layer in Example 7, and Examples 8 to 11 discussed later.

As a polymeric sulfonic acid to be a dopant, polystyrene sulfonic acid and sulfonated polyester were used.

The preparation of the dispersion liquid including the conductive polymer is described in detail. First, a 4% aqueous solution (600 g) of polystyrene sulfonic acid (manufacture by Tayca Corporation; weight-average molecular weight of 100,000) was charged in a stainless steel vessel with an inner volume of 1 litter, into which ferrous sulfate 7 hydrate (0.3 g) was added to dissolve. Then, ethylenedioxythiophene (4 mL) was gradually dropped. A stirrer made of stainless steel was used for stirring. The vessel is attached to a positive electrode and the base of the stirrer had a negative electrode such that a constant current of 1 mA/cm$^2$ was applied for 18 hours to perform an electrolytic oxidation polymerization. After the electrolytic oxidation polymerization, water was added for dilution by 4 times, and an ultrasonic homogenizer [manufactured by Nippon Seiki Co., Ltd; US-T 300 (Trade name)] was used to conduct a dispersion treatment for 30 minutes. Then, 100 g of a cation-exchange resin, AMBERLITE 120B (Trade Name) manufactured by Organo Corporation was added and stirred for one hour. Next, a filter No. 131 manufactured by Toyo Roshi Kaisha, Ltd., was used for filtration. The procedures of the treatment by the cation-exchange resin and the filtration thereafter were repeated three times so as to remove the iron ions and cation components in the liquid.

Thereby treated liquid was filtered through a filter with a porous size of 1 μm. The passing liquid was subject to a treatment by an ultrafiltration device [Manufactured by Sartorius Corporation; VIVAFLOW 200 (Trade Name); molecular-weight fraction of 50,000] to remove low molecule components dispersing in the liquid. Thereby treated liquid was diluted with water to adjust into the concentration of 3%. Into 40 g of the 3% liquid, a high boiling point solvent, that is, dimethyl sulfoxide (4 g), was added, so as to obtain Dispersion Liquid A including a conductive polymer and polystyrene sulfonic acid as a dopant. The content of the dimethyl sulfoxide was 330% with respect to the conductive polymer.

Separate from the above, 200 g of a 3% aqueous solution of sulfonated polyester [Manufactured by Goo Chemical Co. Ltd.; PLAS COAT Z-561(Trade Name); weight-average molecular weight of 27,000] was charged in a vessel with an inner volume of 1 litter, into which an oxidant, ammonium persulfate (2 g) was added to dissolve with stirring with a stirrer. Next, a 40% ferric sulfate aqueous solution (0.4 g) was added with stirring, into which ethylenedioxythiophene (3 mL) was gradually dropped and polymerization of ethylenedioxythiophene was conducted over the period of 24 hours.

After the polymerization, water was added for dilution by 4 times. Then, they were subject to a dispersion treatment by using an ultrasonic homogenizer [Manufactured by Nippon Seiki Co., Ltd; US-T300 (Trade Name)] for 30 minutes. Then, 100 g of a cation-exchange resin, AMBERLITE 120B (Trade Name) manufactured by Organo Corporation was added and stirred for one hour. Then, Filter No. 131 manufactured by Toyo Roshi Kaisha, Ltd., was used for filtration. The treatments by the cation-exchange resin and the filtration were repeated three times to remove all of the cation components in the liquid.

Thereby treated liquid was passed through a filter with a porous size of 1 μm. The passing liquid was subject to a treatment by an ultrafiltration device [Manufactured by Sartorius Corporation; VIVAFLOW 200 (Trade Name); molecular-weight fraction of 50,000], so as to remove the low molecular components dispersed in the liquid. The liquid as treated was diluted with water to adjust into the concentration into 3%. With respect to 40 g of the 3% liquid, a high boiling point solvent, that is dimethyl sulfoxide (4 g), was added with stirring, to obtain Dispersion Liquid B including a conductive polymer and sulfonated polyester as a dopant. The content of the dimethyl sulfoxide was 330% with respect to the conductive polymer.

Then, the Dispersion Liquid A and the Dispersion Liquid B were mixed at a mass ratio of 1:1 to obtain a dispersion liquid including conductive polymers.

Now, a production of a tantalum solid electrolytic capacitor is explained. First, a tantalum sintered body was immersed in a 0.1% phosphoric acid aqueous solution, while the tantalum sintered body was subject to a 50V voltage to conduct a chemical conversion treatment, thereby to provide a capacitor element having formed a tantalum oxidation film on the surface of the tantalum sintered body. Then, the capacitor element was immersed in a 35 v/v % ethylated ethylenedioxythiophene solution (ethanol solution) for one minute, and then, it was taken out and kept still for 5 minutes.

Then, a 60% 2-methylimidazolium phenol sulfonate aqueous solution (pH5), a 40% ammonium persulfate aqueous solution, and a 20% dodecylamine oxide aqueous solution, that had been prepared in advance, were mixed at a mass ratio of 200:200:1 to provide a oxidant and dopant mixture solution including an emulsifier (dodecylamine oxide). Here, the dopant was phenol sulfonic acid whose molecular weight is 174. Into the solution, the capacitor element was immersed for 30 seconds. Then, it was taken out and kept still at room temperature for 10 minutes. Then, it was heated at 70° C. for 10 minutes for conducting polymerization. Then, it was immersed in water and kept for 30 minutes, and then, taken out and dried at 70° C. for 30 minutes. The procedure was repeated one more time. Then, it was dried at 150° C. for one hour to provide a first conductive polymer layer.

As such, the capacitor element having formed the first conductive polymer layer on the dielectric layer was immersed in a 35 v/v % ethylenedioxythiophene solution (ethanol solution) for one minute. Then, it was take out and kept still for 5 minutes. Then, the capacitor element was immersed in the oxidant and dopant solution including the emulsifier. After 30 seconds, it was taken out and kept still for 10 minutes. Then, it was heated at 70° C. for 10 minutes for conducing polymerization. Then, it was immersed in pure water and kept still for 30 minutes. Then, it was taken out and dried at 70° C. for 30 seconds. The procedure was repeated four times to provide a second conductive polymer layer.

Next, the capacitor element, having alternatively formed the first conductive polymer layer and the second conductive polymer layer, was immersed into a dispersion liquid including a conductive polymer and polymeric sulfonic acids (polystyrene sulfonic acid with a weight-average molecular weight of 100,000, and sulfonated polyester with a weight-average molecular weight of 27,000) as a dopant for one minute. Then, it was taken out and dried at 50° C. for 10 minutes and at 150° C. for 10 minutes. The procedure here was repeated twice to provide a third conductive polymer layer.

As described above, the first conductive polymer, the second conductive polymer and the third conductive polymer formed a solid electrolyte. Then, the solid electrolyte was coated with a carbon paste and a silver paste to provide an exterior package to produce a tantalum solid electrolytic capacitor.

That is, the solid electrolytic capacitor of Example 7 included from the side of the dielectric layer of the capacitor element, the first conductive polymer layer made of the ethylated ethylenedioxythiophene monomer ("polymerization on the spot": twice performed); the second conductive polymer layer made of the ethylenedioxythiophene monomer ("polymerization on the spot": four times performed); and the third conductive polymer layer including the polymeric sulfonic acid as dopant (the immersion process into the dispersion liquid including the conductive polymer was performed twice), that were formed in the order, so as to provide the solid electrolyte including the first, second and third conductive polymers.

Example 8

Instead of using the 35 v/v % ethylated ethylenedioxythiophene solution (ethanol solution), a 35 v/v % propylated ethylenedioxythiophene solution (ethanol solution) was used. Other than that, the same procedure as Example 7 was performed to produce a tantalum solid electrolytic capacitor.

That is, the solid electrolytic capacitor of Example 8 included from the side of the dielectric layer of the capacitor element, the first conductive polymer layer made of the propylated ethylenedioxythiophene monomer ("polymerization on the spot": twice performed); the second conductive polymer layer made of the ethylenedioxythiophene monomer ("polymerization on the spot": four times performed); and the third conductive polymer layer including the polymeric sulfonic acid as dopant, in the same manner as Example 7, that were formed in the order, so as to provide the solid electrolyte including the first, the second and third conductive polymers.

Example 9

Instead of repeting two times the "polymerization on the spot" of the ethylated ethylenedioxythiophene monomer and instead of repeating four times the "polymerization on the spot" of the ethylenedioxythiophene monomer in Example 7, the "polymerization on the spot" of the ethylated ethylenedioxythiophene monomer three times and the "polymerization on the spot" of the ethylenedioxythiophene monomer three times. Other than that, the same procedure as Example 7 was performed to produce a tantalum solid electrolytic capacitor.

That is, the dielectric layer of the solid electrolytic capacitor of Example 9 included from the dielectric layer, the first conductive polymer layer made of the ethylated ethylenedioxythiophene monomer ("polymerization on the spot": three times performed); the second conductive polymer layer made of the ethylenedioxythiophene monomer ("polymerization on the spot": three times performed); and the third conductive polymer layer including the polymeric sulfonic acid as a dopant in the same manner as Example 7, that were formed in the order, so as to provide the solid electrolyte including the first, the second and the third conductive polymers.

Example 10

Instead of repeating the "polymerization on the spot" of the ethylated ethylenedioxythiophene monomer twice and instead of repeating the "polymerization on the spot" of the ethylenedioxythiophene monomer four times in Example 7, the "polymerization on the spot" of the ethylated ethylenedioxythiophene was performed four times and the "polymerization on the spot" of the ethylenedioxythiophene monomer was performed twice. Other than that, the same procedure as Example 7 was performed to produce a tantalum solid electrolytic capacitor.

That is, the solid electrolytic capacitor of Example 10 included from the dielectric layer, the first conductive polymer layer made of the ethylated ethylenedioxythiophene monomer ("polymerization on the spot": four times performed); the second conductive polymer layer made of the ethylenedioxythiophene monomer ("polymerization on the spot": twice performed); and the third conductive polymer layer including the polymeric sulfonic acid as a dopant in the same manner as Example 7, that were formed in the order, so as to provide the solid electrolyte including the first, the second and the third conductive polymers.

Example 11

Instead of using the 35 v/v % ethylated ethylenedioxythiophene solution (ethanol solution), a 35 v/v % butylated ethylenedioxythiophene solution (ethanol solution) was used. Other than that, the same procedure as Example 9 was performed to produce a tantalum solid electrolytic capacitor.

That is, the solid electrolytic capacitor of Example 11 included from the dielectric layer, the first conductive polymer layer made of the butylated ethylenedioxythiophene monomer ("polymerization on the spot": three times performed); the second conductive polymer layer made of the ethylenedioxythiophene monomer ("polymerization on the spot": three times performed); and the third conductive polymer layer including the polymeric sulfonic acid as a dopant in the same manner as Example 7, that were formed in the order, so as to provide the solid electrolyte including the first, the second and the third conductive polymers.

Comparative Example 7

Instead of using the 35 v/v % ethylated ethylenedioxythiophene solution (ethanol solution), a 35 v/v % ethylenedioxythiophene solution (ethanol solution) was used. Other than that, the same procedure as Example 7 was performed to produce a tantalum solid electrolytic capacitor.

That is, the solid electrolytic capacitor of Comparative Example 7 included from the dielectric layer, the second conductive polymer layer made of the ethylenedioxythiophene monomer ("polymerization on the spot": six times performed); and the third conductive polymer layer including the polymeric sulfonic acid as a dopant in the same manner as Example 7, that were formed in the order, so as to provide the solid electrolyte including the second conductive polymer and the third conductive polymer.

Comparative Example 8

Without using the 35 v/v % ethylenedioxythiophene solution (ethanol solution), only a 35 v/v % ethylated ethylenedioxythiophene solution (ethanol solution) was used, and the "polymerization on the spot" were repeated six times. Other than that, the same procedure as Example 7 was performed to produce a tantalum solid electrolytic capacitor.

That is, the solid electrolytic capacitor of Comparative Example 8 included from the dielectric layer, the first conductive polymer layer made of the ethylated ethylenedioxythiophene monomer ("polymerization on the spot": six times performed); and the third conductive polymer layer including the polymeric sulfonic acid as a dopant in the same manner as Example 7, that were formed in the order, so as to provide the solid electrolyte including the first conductive polymer and third conductive polymer.

Comparative Example 9

Without using the 35 v/v % ethylenedioxythiophene solution (ethanol solution), only a 35 v/v % propylated ethylenedioxythiophene solution (ethanol solution) was used, and the "polymerization on the spot" were repeated six times. Other than that, the same procedure as Example 7 was performed to produce a tantalum solid electrolytic capacitor.

That is, the solid electrolytic capacitor of Comparative Example 9 included from the dielectric layer, the first conductive polymer layer made of the propylated ethylenedioxythiophene monomer ("polymerization on the spot": six times performed); and the third conductive polymer layer including the polymeric sulfonic acid as a dopant in the same manner as Example 7, that were formed in the order, so as to provide the solid electrolyte including the first conductive polymer and the third conductive polymer.

Comparative Example 10

Without using the 35 v/v % ethylenedioxythiophene solution (ethanol solution), only the 35 v/v % butylated ethylenedioxythiophene solution (ethanol solution) was used, and the "polymerization on the spot" was repeated six times. Other than that, the same procedure as Example 7 was performed to produce a tantalum solid electrolytic capacitor.

That is, the solid electrolytic capacitor of Comparative Example 10 included from the dielectric layer, the first conductive polymer layer made of the butylated ethylenedioxythiophene monomer ("polymerization on the spot": six times performed); and the third conductive polymer layer including the polymeric sulfonic acid as a dopant in the same manner as Example 7, that were formed in the order, so as to provide the solid electrolyte including the first conductive polymer and the third conductive polymer.

With respect to the tantalum solid electrolytic capacitors prepared in Examples 7 to 11 and Comparative Examples 7 to 10, the ESR and the capacitance were measured in the same manner as Example 1, and also, a breakdown voltage test was conducted to examine the breakdown voltage. The results are shown in Table 4. The method to test the breakdown voltage is as follows: While the tantalum solid electrolytic capacitor was applied to a voltage at the speed of 1 V/second, the number when the current exceeded 0.5 A was read to consider it as a breakdown voltage. The test results in Table 4 were obtained by averaging five samples of each example while rounding off the numbers after the decimal point. Note that the breakdown voltage test was conducted on the tantalum solid electrolytic capacitors of Examples 7 to 11 and Comparative Examples 7 to 10. This is because the tantalum solid electrolytic capacitors of Comparative Examples 8 to 10 had a large ESR, which were considered impractical in use as shown in Table 4 below. It was considered meaningless to conduct a breakdown voltage test for them.

TABLE 4

|  | ESR (mΩ) | Capacitance (μF) | Breakdown Voltage (V) |
| --- | --- | --- | --- |
| Example 7 | 19.0 | 152 | 35 |
| Example 8 | 19.7 | 151 | 36 |
| Example 9 | 18.9 | 152 | 37 |
| Example 10 | 21.8 | 151 | 36 |
| Example 11 | 22.9 | 151 | 41 |
| Comparatice Example 7 | 25.3 | 152 | 25 |
| Comparatice Example 8 | 55.9 | 145 | — |
| Comparatice Example 9 | 55.9 | 145 | — |
| Comparatice Example 10 | 101.4 | 136 | — |

As shown in Table 4, the capacitors of Examples 7 to 11 had a lower ESR than the capacitors of Comparative Examples 7 to 10, and had a higher breakdown voltage than capacitor of Comparative Example 7. These results show that the capacitors of the present invention were excellent in the properties.

Example 12

In Examples 1 to 11, tantalum solid electrolytic capacitors were produced to evaluate their properties. In Example 12 and Examples 13 to 14 discussed later, aluminum solid electrolytic capacitors were produced to evaluate their properties.

An etched aluminum foil with 10 mm in length and 3.3 mm in width was provided. As if the point of 5 mm from one side in the length direction is separated from the point of 4 mm from the other side in the length direction, a polyimide solution was applied over a width of 1 mm. Then, it was dried. Next, at the point of 2 mm from the one side in the length direction within the 5 mm area, a positive electrode as a silver wire was provided. The 4 mm area of the foil (4 mm×3.3 mm) was immersed in a 10% adipic acid ammonium aqueous solution; where a 13V voltage was applied to conduct a chemical conversion treatment. Thereby, a dielectric layer of an aluminum oxidation film was formed to provide a capacitor element.

Next, this capacitor element was immersed in a 35 v/v % ethylated ethylenedioxythiophene ethanol solution, which was prepared in advance. It was immersed until the portion where the polyimide was provided. After one minute, it was taken out and kept at room temperature for 5 minutes. Then, it was immersed in a oxidant and dopant solution including an emulsifier, that is a mixture including a 70% 2-methylimidazolium naphthalenetrisulfonate aqueous solution (pH5), a 40% ammonium persulfate aqueous solution and a 20% dodecylamine oxide aqueous solution at a mass ratio of 200:200:1. The capacitor element was immersed at the depth where the polyimide was provided. After 30 seconds, it was taken out, and kept at room temperature for 60 minutes to conduct polymerization. Then, the capacitor element was immersed in water for 30 minutes. Then, it was taken out and dried at 70° C. for 30 minutes. The procedure from immersing the capacitor element in the 35 v/v % ethylated ethylenedioxythiophene ethanol solution to drying it at 70° C. for 30 minutes was repeated one more time. Thereby, a first conductive polymer layer was formed on the dielectric layer of the capacitor element.

Next, instead of using the 35 v/v % ethylated ethylenedioxythiophene ethanol solution, a 35 v/v % ethylenedioxythiophene ethanol solution was used, and the similar procedure as explained above was repeated four times. Thereby, on the first conductive polymer layer, a second conductive polymer layer was formed.

Next, the capacitor element was immersed in a dispersion liquid including the polymeric sulfonic acid as a dopant, similar to one used in Example 7. It was immersed at the depth where the polyimide was provided. After one minute, it was taken out and dried at 50° C. for 10 minutes and at 150° C. for 10 minutes. The process was repeated twice. Thereby, a third conductive polymer layer was formed.

As described above, the capacitor element, having formed the first conductive polymer, second conductive polymer and the third conductive polymer layer in order, was dried at 150° C. for 60 minutes. Then, it was coated with a carbon paste and silver paste to cover the solid electrolyte of the conductive polymer. At the point of 3 mm from the end in the length direction, a negative electrode as a silver wire was provided. Further, an epoxy resin was used to provide an exterior package. After an aging treatment, an aluminum solid electrolytic capacitor was obtained.

That is, the aluminum the solid electrolytic capacitor of Example 12 included from the dielectric layer, the first conductive polymer layer made of the ethylated ethylenedioxythiophene monomer ("polymerization on the spot": twice performed); the second conductive polymer layer made of the ethylenedioxythiophene monomer ("polymerization on the spot": four times performed); and the third conductive polymer layer including the polymeric sulfonic acid as a dopant in the same manner as Example 7 (the process to immerse it into the dispersion liquid including the conductive polymer was repeated twice), that were formed in the order, so as to provide a solid electrolyte including the first conductive polymer, the second conductive polymer and the third conductive polymer.

Example 13

Instead of repeating the "polymerization on the spot" of the ethylated ethylenedioxythiophene monomer twice, and instead of repeating the "polymerization on the spot" of the ethylenedioxythiophene monomer four times in Example 12, the "polymerization on the spot" of the ethylated ethylenedioxythiophene monomer was repeated three times, and the "polymerization on the spot" of the ethylenedioxythiophene monomer three times. Other than that, the same procedure as Example 12 was performed to produce an aluminum solid electrolytic capacitor.

That is, the solid electrolytic capacitor of Example 13 included from the dielectric layer, the first conductive polymer layer made of the ethylated ethylenedioxythiophene monomer ("polymerization on the spot": three times performed); the second conductive polymer layer made of the ethylenedioxythiophene monomer ("polymerization on the spot": three times performed); and the third conductive polymer layer including the polymeric sulfonic acid as a dopant in the same manner as Example 12, that were formed in the order, so as to provide the solid electrolyte including the first conductive polymer, the second conductive polymer and the third conductive polymer.

Example 14

Ethylated ethylenedioxythiophene was diluted with ethanol to obtain a 25 v/v % solution. Into the solution, in the same manner as Example 12, the capacitor, having formed the dielectric layer of the aluminum oxidation film on the aluminum etched foil, was immersed. After one minute, it was taken out and kept still for 5 minutes. Then, it was immersed in a 40% ethanol solution of iron paratoluene sulfonate (paratoluene sulfonic acid and iron were included at a mole ratio of 2.8:1). After 30 seconds, it was taken out, and kept at room temperature for 80 minutes for polymerization. Then, the capacitor element was immersed in ethanol. After 30 minutes, it was taken out and dried at 70° C. for 30 minutes. This procedure was repeated one more time. Thereby, a first conductive polymer layer was formed on the dielectric body of the capacitor element.

Next, instead of using the 25 v/v % ethylated ethylenedioxythiophene solution, a 25 v/v % ethylenedioxythiophene solution (ethanol solution) was used. Other than that, the same procedure was repeated four times, so as to provide a second conductive polymer layer on the first conductive polymer layer.

Further, the capacitor element was immersed in a dispersion liquid of a conductive polymer that was similarly used in Example 12, including the polymeric sulfonic acid as a dopant. After one minute, it was taken out and dried at 50° C. for 10 minutes and at 150° C. for 10 minutes. The procedure was repeated twice, so as to provide a third conductive polymer layer.

The capacitor element, having formed the first conductive polymer, the second conductive polymer and the third conductive polymer in order, was dried at 150° C. for 60 minutes. Then, it was coated with a carbon paste and a silver paste to cover the solid electrolyte of the conductive polymer. At the point of 3 mm from the end of the length direction, a negative electrode as a silver wire was attached. An epoxy resin was provided as an exterior package. After an aging treatment, an aluminum solid electrolytic capacitor was obtained.

That is, the aluminum the solid electrolytic capacitor of Example 14 included from the dielectric layer, the first conductive polymer layer made of the ethylated ethylenedioxythiophene monomer ("polymerization on the spot": twice performed); the second conductive polymer layer made of the ethylenedioxythiophene monomer ("polymerization on the spot": four times performed); and the third conductive polymer layer including the polymeric sulfonic acid as a dopant that was similar to Example 12, that were formed in the order, so as to provide the solid electrolyte including the first conductive polymer, the second conductive polymer and the third conductive polymer.

Comparative Example 11

Instead of using the 35 v/v % ethylated ethylenedioxythiophene solution (ethanol solution), a 35 v/v % ethylenedioxythiophene solution (ethanol solution) was used. Other than that, the same procedure as Example 12 was performed to produce an aluminum solid electrolytic capacitor.

That is, the aluminum the solid electrolytic capacitor of Comparative Example 11 included from the dielectric layer, the second conductive polymer layer made of the ethylenedioxythiophene monomer ("polymerization on the spot": six times performed); the third conductive polymer layer including the sulfonic acid as a dopant similar to Example 12, that were formed in the order, so as to provide the solid electrolyte including the second conductive polymer and the third conductive polymer.

Comparative Example 12

Without using a monomer of ethylenedioxythiophene, only the 35 v/v % ethylated ethylenedioxythiophene solution (ethanol solution) was used and the "polymerization on the spot" was performed six times. Other than that, the same procedure as Example 12 was performed to produce an aluminum solid electrolytic capacitor.

That is, the aluminum the solid electrolytic capacitor of Comparative Example 12 included from the dielectric layer, the first conductive polymer layer made of the ethylated ethylenedioxythiophene monomer ("polymerization on the spot": six times performed); the third conductive polymer layer including the polymeric sulfonic acid as a dopant similar to Example 12, that were formed in the order, so as to provide the solid electrolyte including the first conductive polymer and the third conductive polymer.

Comparative Example 13

Instead of using the 25 v/v % ethylated ethylenedioxythiophene solution (ethanol solution), a 25 v/v % ethylenedioxythiophene solution (ethanol solution) was used. Other than that, the same procedure as Example 14 was performed to produce an aluminum solid electrolytic capacitor.

That is, the aluminum the solid electrolytic capacitor of Comparative Example 13 included from the dielectric layer, the second conductive polymer layer made of the ethylenedioxythiophene monomer ("polymerization on the spot": six times performed); and the third conductive polymer layer including the polymeric sulfonic acid as a dopant similar to Example 12, that were formed in the order, so as to provide the electrolyte including the second conductive polymer and the third conductive polymer.

Comparative Example 14

Without using a monomer of ethylenedioxythiophene, only the 25 v/v % ethylated ethylenedioxythiophene solution (ethanol solution) was used, and the "polymerization on the spot" was performed six times. Other than that, the same procedures as Example 14 were performed to produce an aluminum solid electrolytic capacitor.

That is, the aluminum the solid electrolytic capacitor of Comparative Example 14 included from the dielectric layer, the first conductive polymer layer made of the ethylated ethylenedioxythiophene monomer ("polymerization on the spot": six times performed); and the third conductive polymer layer including the polymeric sulfonic acid as a dopant layer similar to Example 12, that were formed in the order, so as to provide the solid electrolyte including the first conductive polymer and the third conductive polymer.

The aluminum solid electrolytic capacitors as produced in Examples 12 to 14 and Comparative Examples 11 to 14 were tested to measure the ESR and the capacitance in the same manner as Example 1. Also, the leak current was measure to determine the occurrence of the leak current defect. The results are shown in Table 5.

The measurements were conducted on 10 samples for each example. The values of the ESR and the capacitance shown in Table 5 were obtained by averaging the 10 samples while rounding off to one decimal place. With respect to the occurrence of the leak current defect in Table 5, the total numbers tested are shown in the denominator, and the numbers of pieces of the capacitors that have found the leak current defect are shown in the numerator, which are identified as "leak current defect occurrence (pieces)."

Also, the aluminum solid electrolytic capacitors of Examples 12 to 14 and Comparative Examples 11 to 14 after the measurement of the properties were stored in a constant-temperature bath at 150° C. After 100 hours, the ESR and the capacitance were measured in the same way as discussed above. The results are shown in Table 6.

TABLE 5

| | ESR (mΩ) | Capacitance (μF) | leak current defect occurrence number (pieces) |
|---|---|---|---|
| Example 12 | 14.9 | 10.4 | 0/10 |
| Example 13 | 14.7 | 10.5 | 0/10 |
| Example 14 | 14.4 | 10.3 | 0/10 |
| Comparative Example 11 | 20.4 | 10.3 | 1/10 |
| Comparative Example 12 | 33.8 | 9.8 | 0/10 |
| Comparative Example 13 | 19.9 | 10.2 | 3/10 |
| Comparative Example 14 | 35.4 | 9.7 | 0/10 |

TABLE 6

| | ESR (mΩ) | Capacitance (μF) |
|---|---|---|
| Example 12 | 15.5 | 10.1 |
| Example 13 | 15.4 | 10.2 |
| Example 14 | 16.6 | 10.0 |
| Comparative Example 11 | 21.9 | 10.0 |
| Comparative Example 12 | 102.4 | 9.2 |
| Comparative Example 13 | 23.8 | 9.9 |
| Comparative Example 14 | 149.9 | 9.1 |

As shown in Table 5, the aluminum solid electrolytic capacitors of Examples 12 to 14 (which are hereinafter referred to as "capacitor(s)," instead of referring to as "aluminum solid electrolytic capacitor(s)" for the purpose of simplification) had a lower ESR than the capacitors of Comparative Examples 11 to 14. The results indicate that the former capacitors are excellent in the properties of the capacitor than the latter capacitors. The capacitors of Comparative Example 11 and Comparative Example 13 showed the leak current defect, but the capacitors of Examples 12 to 14 did not show the leak current defect.

As shown in Table 6, the capacitors of Examples 12 to 14 showed less decrease of the ESR after the high temperature storage than those of Comparative Example 12 and Comparative Example 14. The results indicate that the former is excellent in the heat resistance.

INDUSTRIAL APPLICABILITY

According to the present invention, a solid electrolytic capacitor can be produced with having low ESR, excellent heat resistance and reliability under a high temperature condition.

| [Numerical references in the Drawings] | |
|---|---|
| 1 | first conductive polymer layer |
| 2 | second conductive polymer layer |
| 3 | third conductive polymer layer |
| 10 | solid electrolyte |
| 20 | capacitor element |
| 21 | porous material of valve metal |
| 22 | dielectric layer |

What is claimed is:

1. A solid electrolytic capacitor, comprising:
  a capacitor element including a porous material of a valve metal, and a dielectric layer of an oxidation film of the valve metal; and
  a solid electrolyte of a conductive polymer provided on the dielectric layer,
  wherein the solid electrolyte comprises:
    a first conductive polymer layer obtained by oxidation polymerization of 2-alkyl-2,3-dihydro-thieno[3,4-b][1,4]dioxine; and
    a second conductive polymer layer obtained by oxidation polymerization of 2,3-dihydro-thieno[3,4-b][1,4]dioxine or a mixture of 2,3-dihydro-thieno[3,4-b][1,4]dioxine with 2-alkyl-2,3-dihydro-thieno[3,4-b][1,4]dioxine,
  wherein at least one of the first conductive polymer layer and at least one of the second conductive polymer layer are alternatively laminated,
  wherein the first conductive polymer layer is provided on the dielectric layer of the capacitor element.

2. A solid electrolytic capacitor, comprising:
a capacitor element including a porous material of a valve metal, and a dielectric layer of an oxidation film of the valve metal; and
a solid electrolyte of a conductive polymer provided on the dielectric layer,
wherein the solid electrolyte comprises a lamination comprising:
a first conductive polymer layer obtained by oxidation polymerization of 2-alkyl-2,3-dihydro-thieno[3,4-b][1,4]dioxine, including an aromatic sulfonic acid as dopant; and
a second conductive polymer layer obtained by oxidation polymerization of 2,3-dihydro-thieno[3,4-b][1,4]dioxine or a mixture of 2,3-dihydro-thieno[3,4-b][1,4]dioxine with 2-alkyl-2,3-dihydro-thieno[3,4-b][1,4]dioxine, including an aromatic sulfonic acid as dopant,
wherein at least one of the first conductive polymer layer and at least one of the second conductive polymer layer are alternatively laminated,
wherein a third conductive polymer layer including a polymeric sulfonic acid as dopant is further laminated on the lamination,
wherein the first conductive polymer layer is provided on the dielectric layer of the capacitor element.

3. A solid electrolytic capacitor according to claim 1, wherein the 2-alkyl-2,3-dihydro-thieno[3,4-b][1,4]dioxine is at least one selected from the group consisting of 2-methyl-2,3-dihydro-thieno[3,4-b][1,4]dioxine, 2-ethyl-2,3-dihydro-thieno[3,4-b][1,4]dioxine, 2-propyl-2,3-dihydro-thieno[3,4-b][1,4]dioxine, and 2-butyl-2,3-dihydro-thieno[3,4-b][1,4]dioxine.

4. A solid electrolytic capacitor according to claim 2, wherein the 2-alkyl-2,3-dihydro-thieno[3,4-b][1,4]dioxine is at least one selected from the group consisting of 2-methyl-2,3-dihydro-thieno[3,4-b][1,4]dioxine, 2-ethyl-2,3-dihydro-thieno[3,4-b][1,4]dioxine, 2-propyl-2,3-dihydro-thieno[3,4-b][1,4]dioxine, and 2-butyl-2,3-dihydro-thieno[3,4-b][1,4]dioxine.

5. A solid electrolytic capacitor according to claim 1, wherein the valve metal is selected from the group consisting of tantalum, aluminum and niobium.

6. A solid electrolytic capacitor according to claim 2, wherein the valve metal is selected from the group consisting of tantalum, aluminum and niobium.

7. A method for producing a solid electrolytic capacitor, comprising:
providing a capacitor element including a porous material of a valve metal, and a dielectric layer of an oxidation film of the valve metal; and
providing a solid electrolyte of a conductive polymer on the dielectric layer,
wherein the solid electrolyte is formed by the steps comprising:
preparing a first conductive polymer layer by oxidation polymerization of 2-alkyl-2,3-dihydro-thieno[3,4-b][1,4]dioxine; and
preparing a second conductive polymer layer by oxidation polymerization of 2,3-dihydro-thieno[3,4-b][1,4]dioxine or a mixture of 2,3-dihydro-thieno[3,4-b][1,4]dioxine with 2-alkyl-2,3-dihydro-thieno[3,4-b][1,4]dioxine,
wherein at least one of the first conductive polymer layer and at least one of the second conductive polymer layer are alternatively laminated,
wherein the first conductive polymer layer is provided on the dielectric layer of the capacitor element.

8. A method for producing a solid electrolytic capacitor according to claim 7, wherein the steps to form the solid electrolyte further comprises
providing a third conductive polymer layer including a polymeric sulfonic acid as dopant,
wherein the third conductive polymer layer is provided over the first conductive polymer layer or the second conductive polymer layer.

9. A method for producing a solid electrolytic capacitor according to claim 7, wherein the 2-alkyl-2,3-dihydro-thieno[3,4-b][1,4]dioxine is at least one selected from the group consisting of 2-methyl-2,3-dihydro-thieno[3,4-b][1,4]dioxine, 2-ethyl-2,3-dihydro-thieno[3,4-b][1,4]dioxine, 2-propyl-2,3-dihydro-thieno[3,4-b][1,4]dioxine, and 2-butyl-2,3-dihydro-thieno[3,4-b][1,4]dioxine.

10. A method for producing a solid electrolytic capacitor according to claim 7, wherein the valve metal is selected from the group consisting of tantalum, aluminum and niobium.

* * * * *